(12) United States Patent
Matsumoto et al.

(10) Patent No.: US 10,535,897 B2
(45) Date of Patent: Jan. 14, 2020

(54) MOLTEN SALT COMPOSITION, ELECTROLYTE, AND ELECTRIC STORAGE DEVICE, AND METHOD FOR INCREASING A VISCOSITY OF LIQUID MOLTEN SALT

(71) Applicant: NATIONAL INSTITUTE OF ADVANCED INDUSTRIAL SCIENCE AND TECHNOLOGY, Tokyo (JP)

(72) Inventors: Hidetoshi Matsumoto, Tokyo (JP); Takahiro Yuki, Tokyo (JP); Yoichi Tominaga, Tokyo (JP); Hajime Matsumoto, Osaka (JP); Keigo Kubota, Osaka (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 16 days.

(21) Appl. No.: 15/552,591

(22) PCT Filed: Feb. 26, 2016

(86) PCT No.: PCT/JP2016/055746
§ 371 (c)(1),
(2) Date: Aug. 22, 2017

(87) PCT Pub. No.: WO2016/136924
PCT Pub. Date: Sep. 1, 2016

(65) Prior Publication Data
US 2018/0337426 A1 Nov. 22, 2018

(30) Foreign Application Priority Data

Feb. 26, 2015 (JP) .................................. 2015-036245
Jan. 18, 2016 (JP) .................................. 2016-007380

(51) Int. Cl.
*H01M 10/05* (2010.01)
*C01B 33/18* (2006.01)
(Continued)

(52) U.S. Cl.
CPC .......... *H01M 10/0565* (2013.01); *D01F 1/02* (2013.01); *D01F 9/08* (2013.01); *H01G 11/62* (2013.01);
(Continued)

(58) Field of Classification Search
None
See application file for complete search history.

(56) References Cited

U.S. PATENT DOCUMENTS

2011/0165466 A1    7/2011    Zhamu et al.
2011/0177332 A1*    7/2011    Park ........................ C08L 71/02
                                                              428/364
(Continued)

FOREIGN PATENT DOCUMENTS

CN      103151557 A    6/2013
CN      103779092 A    5/2014
(Continued)

OTHER PUBLICATIONS

Patent Cooperation Treaty, International Search Report for PCT/JP2016/055746 dated May 31, 2016, 2 pages.
(Continued)

*Primary Examiner* — Scott J. Chmielecki
(74) *Attorney, Agent, or Firm* — Heslin Rothenberg Farley & Mesiti P.C.; Adolph Bohnstedt

(57) ABSTRACT

The object of the present invention is to provide the gelatinous, molten salt having a high ion-conductivity and an excellent heat resistance.
The object of the present invention can be solved by the inorganic nanofibers having a functional group which inter-
(Continued)

(A)

(B)

molecularly interacts with the molten salt on the surface thereof, and the molten salt composition comprising molten salt; or the method for increasing a viscosity of liquid molten salt characterized in that the inorganic nanofibers having a functional group which inter-molecularly interacts with the molten salt in the surface thereof is added to the liquid molten salt.

13 Claims, 7 Drawing Sheets

(51) Int. Cl.

| | | |
|---|---|---|
| *D01F 9/08* | (2006.01) | |
| *H01M 10/0565* | (2010.01) | |
| *D01F 1/02* | (2006.01) | |
| *H01G 11/62* | (2013.01) | |
| *H01G 11/64* | (2013.01) | |
| *H01G 11/84* | (2013.01) | |
| *H01M 10/0525* | (2010.01) | |
| *D01D 5/00* | (2006.01) | |

(52) U.S. Cl.
CPC ............. *H01G 11/64* (2013.01); *H01G 11/84* (2013.01); *H01M 10/0525* (2013.01); *D01D 5/003* (2013.01); *D10B 2101/02* (2013.01); *H01M 2300/0091* (2013.01)

(56) References Cited

U.S. PATENT DOCUMENTS

| | | | | |
|---|---|---|---|---|
| 2013/0337315 A1* | 12/2013 | Yamamoto | ............ | H01M 4/131 429/163 |
| 2014/0154588 A1 | 6/2014 | Archer et al. | | |

FOREIGN PATENT DOCUMENTS

| | | |
|---|---|---|
| CN | 103825058 A | 5/2014 |
| CN | 104247097 A | 12/2014 |
| JP | 2003157719 A | 5/2003 |
| JP | 2009191408 A | 8/2009 |
| JP | 2011113906 A | 6/2011 |
| JP | 2013201260 A | 10/2013 |
| JP | 2014524917 A | 9/2014 |
| WO | 2012049780 | 4/2012 |

OTHER PUBLICATIONS

Unemoto et al., "Electrical conductivity and dynamics of quasi-solidified lithium-ion conducting ionic liquid at oxide particle surfaces," 2011, pp. 11-20, Solid State Ionics, vol. 201.

Li et al., "Electrospinning: A Simple and Versatile Technique for Producing Ceramic Nanofibers and Nanotubes," 2006, pp. 1861-1869, Journal of the American Ceramic Society vol. 89.

Allen et al., "Surface Modification of ZnO Using Triethoxysilane-Based Molecules," 2008, pp. 13393-13398, Langmuir, vol. 24.

Li et al., TiO2-based ionogel electrolytes for lithium metal batteries, 2015, pp. 831-834, Journal of Power Sources, vol. 293.

EPO Form 1507S—Extended European Search Report, dated Aug. 20, 2018, for corresponding European Application No. 16755668.7.

Reddy M V et al: "Preparation and electrochemical studies of electrospun TiO2 nanofibers and molten salt method nanoparticles", Electrochimica Acta, Elsevier Science Publishers, Barking, GB, vol. 55, No. 9, Mar. 30, 2010 (Mar. 30, 2010), pp. 3109-3117, XP026924552.

Corrected European Search Report in European Application No. 16755668.7. Replaces Aug. 20, 2018 European Search Report. dated Jan. 18, 2019.

Banasri Roy et al. "Controlling the Size and Morphology of TiO2 Powder by Molten and Solid Salt Synthesis", J. Am. Ceram Soc. 91 [8], pp. 2455-2463. 2008.

National Institute of Advanced Industrial Science and Technology, "Materials which turn ionic liquid into gel in very small amount," 4 pages, online search Feb. 5, 2015 at http://www.aist.go.jp/aist_i/new_research/nr20121107/nr20121107.html. (Japanese only) Nov. 7, 2012.

* cited by examiner

MOLTEN SALT COMPOSITION, ELECTROLYTE, AND ELECTRIC STORAGE DEVICE, AND METHOD FOR INCREASING A VISCOSITY OF LIQUID MOLTEN SALT

CROSS REFERENCE TO RELATED APPLICATIONS

This application is a national stage filing under section 371 of International Application No. PCT/JP2016/055746, filed on 26 Feb. 2016, published in Japanese on 1 Sept. 2016 as WO2016/136924 A1 and which claims priority to Japanese Application Nos. JP 2015-036245 filed 26 Feb 2015 and JP 2016-007380 filed 18 Jan. 2016, the entire disclosure of these applications being incorporated herein by reference.

TECHNICAL FIELD

The present invention relates to a molten salt composition, an electrolyte, and an electric storage device, and a method for increasing a viscosity of liquid molten salt. According to the present invention, a quasi solid-state molten salt having a high ion conductivity and an excellent heat resistance, can be obtained. Further, an electric storage device having a high thermal stability can be provided.

BACKGROUND ART

A non-aqueous electrolyte secondary battery such as a lithium ion secondary battery is widely used as an electric power source of portable electronic devices such as mobile phones, video cameras, and laptop computers. Further, it is increasingly used as an electric power source of electric cars, hybrid cars, and large electric storage devices.

At present, a liquid electrolyte wherein an electrolytic salt is solved in a nonaqueous solvent is used as an electrolyte of these non-aqueous electrolyte secondary batteries. However, the liquid electrolyte contains a flammable solvent and a liquid spill sometimes occurs. Therefore, a safety improvement is desired.

In order to improve the safety of lithium ion secondary battery, all solid secondary battery using a dry type solid electrolyte instead of a liquid electrolyte has been developed. In such all solid secondary battery, a flame-resistant ionic liquid, gelatinous electrolyte, and polymer solid electrolyte are examined as a dry type solid electrolyte. However, a practicable secondary battery using the dry type solid electrolyte exhibiting the same performance as liquid electrolyte cannot be obtained.

As mentioned above, the lithium ion secondary battery has a high voltage and a high capacity, and widely used as a secondary battery. However, an amount of deposit of lithium is not abundant, and therefore a magnesium ion secondary battery using a magnesium with abundant reserve is actively developed instead of the lithium ion secondary battery. The magnesium ion secondary battery is characterized in that it is easy to handle, and a theoretical electric capacity density per volume is high.

In fact, however, a practicable electrolytic solution capable of stably and safely charging and discharging has not been found, and therefore the magnesium ion secondary battery is not put into practical use. Further, it has not been reported that the magnesium ion secondary battery is activated using the dry type solid electrolyte.

A molten salt is a salt consisting of cation and anion. Further, it can conduct electricity without adding an electrolyte, and has a wide potential window and a high ion conductivity. Among the molten salts, molten salts having a melting point of 100 to 150° C. are referred to as ionic liquids, although it is not a strict classification. Further, molten salts having a comparatively high melting point, which has flexibility and is not in the crystal state but in the solid status, is sometimes referred to as plastic crystals. The molten salts having characters such as an ion conductivity, a slight volatility, a flame resistance, and a thermal stability, is expected to be applied to the electrolytes of secondary batteries or capacitors.

Molten salts have characters such as an ion conductivity, a slight-volatility, a flame resistance, and a thermal stability, which are suitable for use as the electrolyte, and thus it is considered that the safety of electrochemical devices such as secondary batteries is improved. However, the molten salt is liquid, and therefore, when the molten salt is used in the secondary battery, and the like, there is a problem of liquid spill therefrom.

CITATION LIST

Patent Literature

[PATENT LITERATURE 1] JP 2011-113906 A
[PATENT LITERATURE 2] JP 2009-191408 A

Non-Patent Literature

[NON-PATENT LITERATURE 1] Solid State Ionics (Netherlands) 2011, vol. 201, p. 11-20
[NON-PATENT LITERATURE 2] "Materials which turn ionic liquid into gel in very small amount" [online] Nov. 7, 2012 on public, National Institute of Advanced Industrial Science and Technology, Date of search: Feb. 5, 2015, [http://www.aist.go.jp/aist_j/new_research/nr20121107/nr20121107.html]
[NON-PATENT LITERATURE 3] Journal of the American Ceramic Society (United States of America), 2006, vol. 89, p. 1861-1869
[NON-PATENT LITERATURE 4] Langmuir, (United States of America) 2008, vol. 24, p. 13393-13398
[NON-PATENT LITERATURE 5] Journal of Power Sources, (Netherlands) 2015, vol. 293, p. 831-834

SUMMARY OF INVENTION

Technical Problem

In order to solve the problem of liquid spill, a method for turning the molten salt such as ionic liquid into gel is studied. As the method for turning the molten salt into gel, a method for turning the ionic liquid into gel by adding an inorganic filler as a gelator is reported (Non-patent literature 1). However, an amount of the additive inorganic fillers is heavy in this method, and thus there is a problem of a decrease of ion conductivity of molten salt.

Further, as a method for resolving the problem of a decrease of ion conductivity, a method for turning the molten salt into gel by adding specific organic compounds is reported (Non-patent literature 2). However, the organic compounds are used as a gelator, and thus a heat resistance of the resulting gelled molten salt is low.

Therefore, the object of the present invention is to provide a gelled molten salt exhibiting a high ion conductivity and an excellent heat resistance. Further, the object of the present invention is to provide an electric storage device which does not leak a liquid and produces lower heat, and in particular, to provide an all solid secondary battery which exhibits the same rate performance as the secondary battery using the liquid electrolyte. Furthermore, heretofore, an all solid magnesium ion secondary battery with a sufficient performance cannot be obtained, and thus another object of the present invention is to provide an all solid magnesium ion secondary battery which can work.

Solution to Problem

The present inventors have conducted intensive studies for a gelled molten salt having a high ion conductivity and an excellent heat resistance. As a result, the present inventors, surprisingly, found that a viscosity of molten salt can be increased by adding an inorganic nanofiber having a functional group capable of molecularly-interacting with molten salt, on a surface, and then the liquid molten salt can be quasi-solidified. That is, the present inventors found that the molten salt can be quasi-solidified by using, as a novel filler, the inorganic nanofiber having a functional group capable of molecularly-interacting with molten salt on a surface. Further, the inventors have conducted intensive studies for an electric storage device which does not leak a liquid and produces lower heat. As a result, the present inventors, surprisingly, found that a secondary battery exhibiting an excellent battery performance, and a capacitor exhibiting electrical storage performance can be obtained by using the inorganic nanofiber having a functional group capable of molecularly-interacting with molten salt on a surface, a molten salt, and an electrolyte containing a metal ion.

The present invention is based on the above findings.
Accordingly, the present invention relates to:
[1] a molten salt composition characterized by comprising an inorganic nanofiber having a functional group capable of molecularly-interacting with molten salt on a surface, and molten salt,
[2] the molten salt composition of item [1], wherein the inorganic nanofiber is selected from the group consisting of $SiO_2$ nanofiber, $TiO_2$ nanofiber, ZnO nanofiber, $Al_2O_3$ nanofiber, $ZrO_2$ nanofiber and combinations of two or more thereof,
[3] the molten salt composition of item [1] or [2], wherein the molten salt comprises at least one cation selected from the group consisting of imidazolium cation, pyridinium cation, piperidinium cation, pyrrolidinium cation, phosphonium cation, morpholinium cation, sulfonium cation, and ammonium cation, and at least one anion selected from the group consisting of carboxylate anion, sulfonate anion, halogen anion, hydroxy anion, imide anion, boron anion, cyano anion, phosphorus anion, and nitrate anion,
[4] the molten salt composition of items [1] to [3], wherein the molten salt is a deep eutectic solvent,
[5] the molten salt composition of items [1] to [4], wherein the functional group is selected from the group consisting of an amino group, a hydroxyl group, a carboxyl group, a siloxane group, and combinations of two or more thereof,
[6] the molten salt composition of items [1] to [5], wherein an amount of the inorganic nanofiber is 0.5 to 10.0% by weigh,
[7] an electrolyte characterized by comprising the molten salt composition according to any one of claims 1 to 6, and a metal ion,
[8] the electrolyte of item [7], wherein the metal ion is selected from the group consisting of lithium ion, calcium ion, sodium ion, and magnesium ion,
[9] an electric storage device comprising an electrolyte of item [7] or [8], a positive electrode containing a positive electrode active material, and a negative electrode containing a negative electrode active material
[10] the electric storage device of item [9], which is a non-aqueous electrolyte secondary battery, an electric double layer capacitor, or a hybrid capacitor
[11] a method for increasing a viscosity of liquid molten salt, characterized in that an inorganic nanofiber having a functional group capable of molecularly-interacting with molten salt, on a surface, is added to the liquid molten salt,
[12] the method for increasing a viscosity of liquid molten salt of item [11], wherein the inorganic nanofiber is selected from the group consisting of $SiO_2$ nanofiber, $TiO_2$ nanofiber, ZnO nanofiber, $Al_2O_3$ nanofiber, $ZrO_2$ nanofiber and combinations of two or more thereof,
[13] the method for increasing a viscosity of liquid molten salt of item [11] or [12], wherein the liquid molten salt comprises at least one cation selected from the group consisting of imidazolium cation, pyridinium cation, piperidinium cation, pyrrolidinium cation, phosphonium cation, morpholinium cation, sulfonium cation, and ammonium cation, and at least one anion selected from the group consisting of carboxylate anion, sulfonate anion, halogen anion, hydroxy anion, imide anion, boron anion, cyano anion, phosphorus anion, and nitrate anion
[14] The method for increasing a viscosity of liquid molten salt of items [11] to [13], wherein the functional group is selected from the group consisting of an amino group, a hydroxyl group, a carboxyl group, a siloxane group, and combinations of two or more thereof, and
[15] the method for increasing a viscosity of liquid molten salt of items [11] to [14], wherein an additive amount of the inorganic nanofiber is 0.5 to 10.0% by weight.

Non-Patent Literature 5 discloses a lithium ion secondary battery using an electrolyte in which $TiO_2$ filler is added to an ionic liquid gel. However, this lithium ion secondary battery cannot exert a sufficient rate performance.

Further, Patent Literature 1 discloses a lithium ion secondary battery using an electrolyte in which inorganic oxide particles having crosslinkable functional groups are added to an ionic liquid and the functional groups polymerize. However, in the secondary battery disclosed in Patent Literature 1, the ionic liquid is solidified by polymerizing the crosslinkable functional groups, and thus the invention disclosed in Patent Literature 1 is different from the present invention.

Advantageous Effects of Invention

According to the method for increasing a viscosity of liquid molten salt of the present invention, the viscosity of molten salt can be increased and the molten salt can be quasi-solidified or can be turned into gel. Further, the electrolyte in which a metal ion is added to the molten salt composition of the present invention, can prevent the liquid spill of an electrolyte in the secondary battery or the capacitor. The molten salt composition of the present invention has characters such as an ion conductivity, a slight-volatility, a flame resistance, and a thermal stability, and therefore safe electrochemical devices such as a secondary battery and a capacitor which are safe and exhibit an excellent battery performance, can be provided. Further, the inorganic nanofiber in which the functional group capable of molecularly-interacting with the molten salt used in the present invention is introduced, has a high heat resistance, and thus can be used at a wide temperature range of −95° C. to 400° C. Therefore, the molten salt composition and the method for increasing a viscosity of liquid molten salt of the present invention can be applied to various applications used at a wide temperature range. In particular, by using the inorganic nanofiber having a functional group capable of molecularly-interacting with molten salt on a surface, a molten salt, and an electrolyte containing a metal ion, the all solid secondary battery in which a separator is not required, there is no risk of the electrolyte leak, and thermal stability can be maintained up to around the temperature of decomposition of electrolyte components, can be obtained. Further, in the all solid lithium ion secondary battery using the lithium ion, an equal or even more excellent rate performance can be obtained compared to the liquid electrolyte. Specifically, at high temperatures, the molten salt composition of the present invention exhibits a more excellent rate performance than the liquid electrolyte. When the electrolyte solidified by adding the conventional filler to the ionic liquid is used, the conductivity is decreased and thus a sufficient performance as the electrolyte cannot be achieved. However, in the electrolyte of the present invention, the decrease of conductivity can be prevented. Further, compared to the secondary battery using the ionic liquid and separator, the electrolyte of the present invention has a low charge transfer resistance at a lithium metal interface, and thus an excellent contactability to an electrode can be obtained. Furthermore, by using the electrolyte, the multivalent ion secondary battery such as a magnesium ion secondary battery can be activated. Specifically, compared to the secondary battery using the ionic liquid and separator, the secondary battery using the electrolyte of the present invention can show excellent charge-discharge capacities. In addition, the secondary battery using the electrolyte can be use at high temperature.

DESCRIPTION OF EMBODIMENTS

[1] Molten Salt Composition

Figure 1:
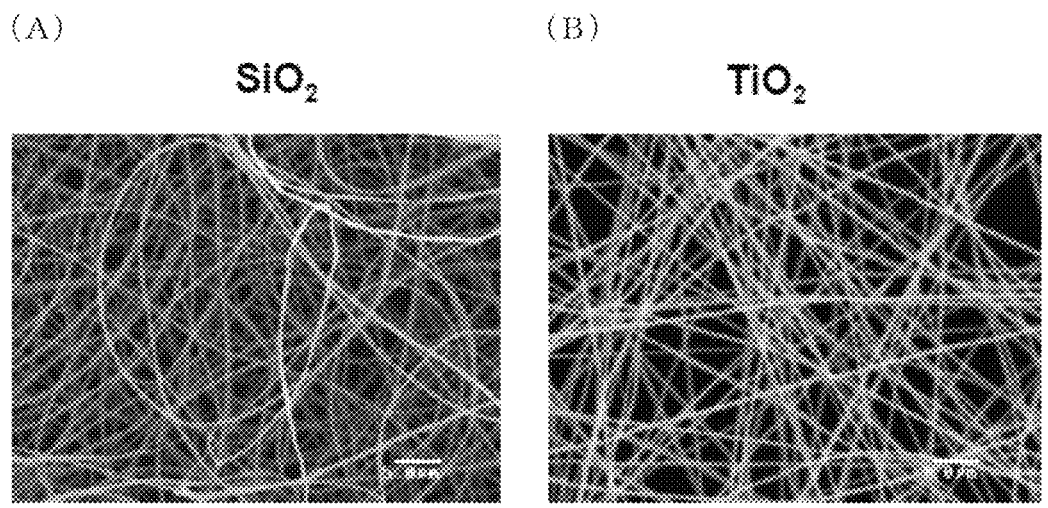
FIG. 1 is photographs showing $SiO_2$ nanofiber (A), and $TiO_2$ nanofiber (B) used in the present invention.

The molten salt composition of the present invention is characterized by comprising an inorganic nanofiber in which the functional group capable of molecularly-interacting with the molten salt is introduced on a surface, and molten salt.

«Molten Salt»

Molten salt is consisting of cation and anion, and exhibits the characters such as the high ion conductivity, the wide potential window, the flame resistance, and the thermal stability.

The molten salt which may be used in the present invention is not limited, so long as it may become liquid state, but includes, for example, ionic liquid. In the present specification, the term "ionic liquid" means a molten salt having a melting point of 150° C. or less. However, in the present specification, the molten salt includes one having a melting point of more than 150° C. Further, the term "molten salt" as used herein includes a plastic crystal which can become a liquid-state, and can become a solid-state which is more flexible than a crystal state. A melting point of the molten salt is not particularly limited, but the molten salt having a melting point of 95° C. to 400° C. can be used in the present invention. The lower limit of the melting point is around −95° C., and the inorganic nanofiber in which the functional group capable of molecularly-interacting with the molten salt is introduced, can increase the viscosity of the molten salt even at 0° C. or less. Further, the inorganic nanofiber in which the functional group capable of molecularly-interacting with the molten salt is introduced, can maintain the function thereof even at 400° C., and thus, the inorganic nanofiber can increase the viscosity of the molten salt. Therefore, the molten salt composition of the present invention can function at a range of −95 to 400° C.

(Cation)

The cation constituting the molten salt is not particularly limited, but includes imidazolium cation, pyridinium cation, piperidinium cation, pyrrolidinium cation, phosphonium cation, morpholinium cation, sulfonium cation or ammonium cation.

Specific examples of the cation include 1-methyl-1-pentylpyrrolidinium cation, 1-methyl-1-hexylpyrrolidinium cation, 1-methyl-1-heptylpyrrolidinium cation, 1-ethyl-1-propylpyrrolidinium cation, 1 ethyl-1-butylpyrrolidinium cation, 1-ethyl-1-pentylpyrrolidinium cation, 1-ethyl-1-hexylpyrrolidinium cation, 1-ethyl-1-heptylpyrrolidinium cation, 1,1-dipropylpyrrolidinium cation, 1-propyl-1-butylpyrrolidinium cation, 1,1-dibutylpyrrolidinium cation, 1-propylpiperidinium cation, 1-pentylpiperidinium cation, 1,1-dimethyl piperidinium cation, 1-methyl-1-ethyl piperidinium cation, 1-methyl-1-propyl piperidinium cation, 1-methyl-1-butylpiperidinium cation, 1-methyl-1-pentylpiperidinium cation, 1-methyl-1-hexylpiperidinium cation, 1-methyl-1-heptylpiperidinium cation, 1 ethyl-1-propyl piperidinium cation, 1-ethyl-1-butyl piperidinium cation, 1-ethyl-1-pentyl piperidinium cation, 1-ethyl-1-hexylpiperidinium cation, 1-ethyl-1-heptylpiperidinium cation, 1,1-dipropyl piperidinium cation, 1-propyl-1-butyl piperidinium cation, 1,1-dibutylpiperidinium cation, 2-methyl-1-pyrroline cation, 1-ethyl-2-phenylindole cation, 1,2-dimethylindole cation, 1-ethylcarbazole cation, or N-ethyl-N-methyl morpholinium cation.

Another specific examples of the cation include 1,3-dimethylimidazolium cation 1,3-diethylimidazolium cation, 1-ethyl-3-methylimidazolium cation, 1-butyl-3-methylimidazolium cation, 1-hexyl-3-methylimidazolium cation, 1-octyl-3-methylimidazolium cation, 1-decyl-3-methylimidazolium cation, 1-dodecyl-3-methylimidazolium cation, 1-tetradecyl-3-methylimidazolium, 1,2-dimethyl-3-propylimidazolium cation, 1-ethyl-2,3-dimethylimidazolium cation, 1-butyl-2,3-dimethylimidazolium cation, 1-hexyl-2,3-dimethylimidazolium cation, 1-(2-hydroxyethyl)-3-methylimidazolium cation, 1-allyl-3-methylimidazolium cation, 1,3-dimethyl-1,4,5,6-tetrahydropyrimidinium cation, 1,2,3-trimethyl-1,4,5,6-tetrahydropyrimidinium cation, 1,2,3,4-tetramethyl-1,4,5,6-tetrahydropyrimidinium cation, 1,2,3,5-tetramethyl-1,4,5,6-tetrahydropyrimidinium cation, 1,3-dimethyl-1,4-dihydropyrimidinium cation, 1,3-dimethyl-1,6-dihydropyrimidinium cation, 1,2,3-trimethyl-1,4-dihydropyrimidinium cation, 1,2,3-trimethyl-1,6-dihydropyrimidinium cation, 1,2,3,4-tetramethyl-1,4-dihydropyrimidinium cation, or 1,2,3,4-tetramethyl-1,6-dihydropyrimidinium.

Further, another specific examples of the cation include 1-methylpyrazolium cation, 3-methylpyrazolium cation, 1-ethyl-2-methylpyrazolinium cation, 1-ethyl-2,3,5-trimethylpyrazolium cation, 1-propyl-2,3,5-trimethylpyrazolium cation, 1-butyl-2,3,5-trimethylpyrazolium cation, 1-ethyl-2,3,5-trimethylpyrazolinium cation, 1-propyl-2,3,5-trimethylpyrazolinium cation, or a 1-butyl-2,3,5-trimethylpyrazolinium cation.

Furthermore, another specific examples of the cation include tetramethylammonium cation, tetraethylammonium cation, tetrabutylammonium cation, tetrapentylammonium cation, tetrahexyl ammonium cation, tetraheptylammonium cation, triethylmethylammonium cation, tributylethylammonium cation, trimethyldecylammonium cation, N, N-diethyl-N-methyl-N-(2-methoxyethyl) ammonium cation, glycidyl trimethyl ammonium cation, trimethylsulfonium cation, triethylsulfonium cation, tributylsulfonium cation, trihexylsulfonium cation, diethylmethylsulfonium cation, dibutylethylsulfonium cation, dimethyldecylsulfonium cation, tetramethylphosphonium cation, tetraethylphosphonium cation, tetrabutylphosphonium cation, tetrahexylphosphonium cation, tetraoctylphosphonium cation, triethylmethylphosphonium cation, tributylethylphosphonium cation, trimethyldecylphosphonium cation, or diallyldimethylammonium cation.

(Anion)

The anion constituting the molten salt is not particularly limited, but includes carboxylate anion, sulfonate anion, halogen anion, hydroxy anion, imide anion, boron anion, cyano anion, phosphorus anion, or nitrate anion.

In connection with this, the "imide" is sometimes referred to as the "amide", and thus the both terms are used in the present specification.

Specific examples of the anion include $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, $(CF_3SO_2)(CF_3CO)N^-$, $SCN^-$, $C_2F_5SO_3^-$, $C_3F_7SO_3^-$, $C_4F_9SO_3^-$, $(FSO_2)_2N^-$, $(C_3F_7SO_2)_2N^-$, $(C_4F_9SO_2)_2N^-$, $(CH_3O)_2PO_2^-$, $(C_2H_5O)_2PO_2^-$, $(CN)_2N^-$, $(CN)_3C^-$, $CH_3OSO_3^-$, $C_4H_9OSO_3^-$, $C_2H_5OSO_3^-$, $n\text{-}C_6H_{13}OSO_3^-$, $n\text{-}C_8H_{17}OSO_3^-$, $CH_3(OC_2H_4)_2OSO_3^-$, $(C_2F_5)_3PF_3^-$, or $CH_3C_6H_4SO_3^-$. As a compound containing the anion, for example, there may be mentioned tetrafluoroborate ($HBF_4$), hexafluorophosphate ($HPF_6$), bis (trifluoromethanesulfonyl) imide ($C_2HF_6NO_4S_2$), or bis (fluorosulfonyl) imide ($F_2NO_4S_2$).

(Molten Salt)

The molten salt used herein is not limited, but the molten salts in which the above cation is combined with the above anion can be used. For example, there may be mentioned 1-ethyl-3-methylimidazolium chloride, 1-ethyl-3-methylimidazolium bromide, 1-ethyl-3-methylimidazolium bis (trifluorosulfonyl) imide, 1-ethyl-3-methylimidazolium formate, 1-ethyl-3-methylimidazolium acetate, 1-butyl-3-methylimidazolium chloride, 1-butyl-3-methylimidazolium bromide, 1-butyl-3-methylimidazolium tetrafluoroborate, 1-butyl-3-methylimidazolium bis (trifluorosulfonyl) imide, 1-butyl-3-methylimidazolium thiocyanate, 3-methyl-octylimidazolium chloride, 3-methyl-hexadecylimidazolium chloride, N-ethylpyridinium chloride, N-ethylpyridinium bromide, N-butylpyridinium chloride, N-butylpyridinium bromide, N-octylpyridinium chloride, 4-methyl-N-butylpyridinium chloride, 4-methyl-N-butylpyridinium bromide, N-methyl-N-propylpyrrolidinium bis (trifluorosulfonyl) imide, 1,1-dimethylpyrrolidinium iodide, 1-butyl-1-methylpyrrolidinium chloride, hexyl-1-methylpyrrolidinium chloride, 1-methyl-1-octylpyrrolidinium chloride, N-butyl-N-methylpyrrolidinium bis (trifluorosulfonyl) imide, N-methyl-N-propyl piperidinium bis (trifluorosulfonyl) imide, trihexyl (tetradecyl) phosphonium chloride, trihexyl (tetradecyl) phosphonium tetrafluoroborate, N, N-diethylmethyl-(2-methoxyethyl) ammonium bis (trifluorosulfonyl) imide, N, N-diethylmethyl-(2-methoxyethyl) ammonium tetrafluoroborate, N, N-diethylmethyl-(2-methoxyethyl) ammonium hexafluorophosphate, N, N-diethylmethyl-(2-methoxyethyl) ammonium chloride, N, N-diethylmethyl-(2-methoxyethyl) ammonium bromide, N, N-diethylmethyl-(2-methoxyethyl) ammonium formate, N, N-diethylmethyl-(2-methoxyethyl) ammonium acetate, and the like.

As the molten salt, a deep eutectic solvent may be used. The deep eutectic solvent is a liquid which is provided by mixing an ionic solid and a covalent solid. That is to say, it is an ionic solvent comprising the mixture capable of forming an eutectic having a lower melting point than melting points of the respective components.

«Inorganic Nanofiber Having a Functional Group Capable of Molecularly-interacting with Molten Salt»

The inorganic nanofiber used herein is not limited, so long as it has a functional group capable of molecularly-interacting with molten salt, and can increase the viscosity of the molten salt by adding the molten salt. The functional group may be originally contained in the inorganic nanofiber, or may be introduced into the inorganic nanofiber.

The inorganic nanofiber is not limited, but includes, for example, a $SiO_2$ nanofiber, $TiO_2$ nanofiber, a ZnO nanofiber, an $Al_2O_3$ nanofiber, a $ZrO_2$ nanofiber or a combination thereof. Physical properties of the inorganic nanofiber are not limited, as long as the effect of the present invention can be achieved. However, a diameter of the inorganic nanofiber is preferably 10 nm to 10 µm, more preferably 50 nm to 3 µm, most preferably 50 nm to 1 µm. An aspect ratio (length/diameter) of the inorganic nanofiber is also not limited, but preferably 100 or more, more preferably 1000 or more.

The functional group is not limited, but includes, for example, an amino group, a hydroxyl group, a carboxyl group, a siloxane group, or combinations thereof.

Therefore, as the inorganic nanofiber having the functional group, there may be mentioned a $SiO_2$ nanofiber having an amino group, a hydroxyl group, a carboxyl group, or a siloxane group, a $TiO_2$ nanofiber having an amino group, a hydroxyl group, a carboxyl group, or a siloxane group, ZnO nanofiber having an amino group, a hydroxyl group, a carboxyl group, or a siloxane group, $Al_2O_3$ nanofiber having an amino group, a hydroxyl group, a carboxyl group, or a siloxane group, $ZrO_2$ nanofiber having an amino group, a hydroxyl group, a carboxyl group, or a siloxane group, or a combination thereof.

The term "functional group capable of molecularly-interacting with molten salt" used herein means a functional group which can interact with the cation or the anion in the molten salt. As shown in Example 1 and Comparative Example 1, in the molten salt composition of the present invention, the inorganic nanofiber has functional group, and thus the viscosity of the molten salt can be increased. Therefore, the molten salt composition can be quasi-solidified or can be turned into gel.

«Method for Preparing an Inorganic Nanofiber Having a Functional Group (1)»

The inorganic nanofiber having a functional group may be prepared, for example, by the following known procedures (for example, Non-patent literature 3).

First, a metal oxide precursor is thickened by a sol-gel reaction (such as a hydrolysis and polycondensation reaction). Then, fibers are formed by an electrospinning method. The metal oxide precursor, which can be used in theسol-gel reaction, is not limited, but includes, for example, metal alkoxides which are precursors of $SiO_2$, $TiO_2$, ZnO, $Al_2O_3$, $ZrO_2$, or the like. High-molecular weight forms of metal oxide can be obtained by appropriately-regulating conditions of sol-gel reactions of these metal alkoxides. In order to adjust a viscosity of a spinning solution, a water-soluble polymer such as polyethylene oxide, polyvinyl alcohol, and polyvinyl pyrrolidone may be added thereto, in the electrospinning. The nanofiber obtained by the electrospinning method is subjected to a calcination treatment, and then subjected to a surface treatment for introducing the functional group, to obtain the inorganic nanofiber having the functional group. As a method for introducing the functional group, for example, the known method (for example, Non-patent literature 4) is used. In particular, a side chain such as an alkyl chain is introduced on a surface of the metal oxide by using phosphonic acid or alkoxysilane as an anchor, and an amino group, a carboxyl group, a hydroxyl group, or a silanol group can be introduced on the end.

($SiO_2$ Nanofiber Having Amino Group)

The $SiO_2$ nanofiber having the amino group in the inorganic nanofibers having the functional group can be prepared by the spinning method of silica-containing fiber described in Patent literature 2.

In particular, a component (a) i.e., tetraalkoxysilane and/or a condensate thereof, a component (b) i.e., a silane compound containing an amino group, and a component (c) i.e., boric acid were mixed, and, if needed, a component (d) i.e., an organic acid and/or a component (e) i.e., an electrolyte were further mixed, to prepare a sol spinning solution. The $SiO_2$ nanofiber having the amino group can be obtained by spinning the sol spinning solution through the electrospinning method and the like.

As an alkoxy group of the tetraalkoxysilane, there may be mentioned a methoxy group, an ethoxy group, a propoxy group, a butoxy group, and alkoxy groups containing a larger number of carbon atoms than the above groups. Examples of the tetraalkoxysilane include tetramethoxysilane, tetraethoxysilane, tetrapropoxysilane, tetrabutoxysilane, and the like. An amount of the tetraalkoxysilane is preferably 30 to 80% by weight.

As an organic group contained in the silane compound, there may be mentioned a monoaminomethyl group, a diaminomethyl group, a triaminomethyl group, a monoaminoethyl group, a diaminoethyl group, a triaminoethyl group, a tetraaminoethyl group, a monoaminopropyl group, a diaminopropyl group, a triaminopropyl group, a tetraaminopropyl group, a monoaminobutyl group, a diaminobutyl group, a triaminobutyl group, a tetraaminobutyl group, and an organic group having an alkyl group or an aryl group containing a larger number of carbon atoms than the above groups. An amount of boric acid is preferably 0.1 to 10% by weight.

An amount of the silane compound is preferably 10 to 40% by weight. The spinning method is not particularly limited, and the known method in this field can be used.

«Method for Preparing Inorganic Nanofiber Having Functional Group (2)»

As shown in Manufacturing Example 2 to 4, the inorganic nanofiber having the functional group can be prepared by performing a chemical treatment on the surface of the nanofiber after the inorganic nanofiber preparation. For example, the nanofiber such as $SiO_2$ nanofiber, titania nanofiber, or alumina nanofiber is prepared according to the conventional method. The resulting nanofibers are immersed in 3-aminopropylethoxysilane/toluene solution, filtered under reduced pressure, and heat-dried. Then, it is washed for 5 minutes by ultrasonic in toluene. Then, it is filtered under reduced pressure again, washed in acetone, and vacuum-dried, to thereby introduce the amino group on the surface of the nanofibers.

(Weight Ratio Between Molten Salt and Inorganic Nanofiber)

An amount of the inorganic nanofiber contained in the molten salt composition of the present invention is not limited, as long as the viscosity of the molten salt is increased, and then the molten salt is quasi-solidified, but the lower limit is preferably 0.5% by weight, more preferably 1.0% by weight, most preferably 1.5% by weight. The upper limit of the amount is not particularly limited, but preferably 10.0% by weight or less, more preferably 9.0% by weight or less, most preferably 8.0% by weight or less.

The inorganic nanofiber contained in the molten salt composition of the present invention can increase a viscosity of the molten salt in small amounts, and can make the molten salt quasi solid-state or can turn the molten salt into gel. That is to say, a stable quasi solid-state or gel-state can be maintained by forming three-dimensional networks using small amounts of the inorganic nanofiber. An amount of the inorganic nanofiber is small, and thus an ionic conductivity of the molten salt is little affected thereby. Therefore, the molten salt composition of the present invention can show high ion conduction efficiency.

When a temperature of the molten salt composition is 150° C. or less, a viscosity of the molten salt can be increased by a relatively small amount of inorganic nanofiber, and it can be quasi-solidified or can be turned into gel. Thus, the upper limit of the amount of the inorganic nanofiber is, for example, 5.0% by weight, preferably 4.5% by weight, more preferably 4.0% by weight. However, if the temperature of the molten salt composition is high, the viscosity of the molten salt is decreased. Thus, when the temperature of the molten salt is high, a large amount of the inorganic nanofiber is preferable.

[2] Electrolyte

The electrolyte of the present invention contains the molten salt composition, and a metal ion.

(Viscosity of Electrolyte)

The viscosity of the electrolyte is not particularly limited, as long as the electrolyte does not leak out from the electric storage device such as the secondary battery, but preferably 10,000 Pa·s or more, more preferably 100,000 Pa·s or more, most preferably 200,000 Pa·s or more. When the viscosity of the electrolyte is 10,000 Pa·s or more, the electrolyte can be quasi-solidified. Therefore, the electrolyte can be used without requiring the separator, and there is no risk of an electrolyte leakage.

(Metal Ion)

The electrolyte comprises the metal ion. The metal ion used in the electric storage device may be appropriately selected. For example, the metal ion includes lithium ion, calcium ion, sodium ion, or magnesium ion.

The metal ion can be added to the electrolyte in the state of a metal salt. That is, it can be added thereto in the state of lithium salt, calcium salt, sodium salt, or magnesium salt.

The lithium salt is not limited, but includes an inorganic lithium salt in which a carbon atom is not contained in anion, and an organic lithium salt in which a carbon atom is contained in anion.

As the inorganic lithium salt, for example, there may be mentioned $LiPF_6$, $LiBF_4$, $LiClO_4$, $LiAsF_6$, $Li_2SiF_6$, $LiSbF_6$, $LiAlO_4$, $LiAlCl_4$, or $Li_2B_{12}F_bH_{12-b}$ (wherein b is an integer of 0 to 3).

As the organic lithium salt, there may be mentioned an organic lithium salt represented by $LiN(SO_2C_mF_{2m+1})_2$ (wherein m is an integer of 1 to 8) such as lithium bis (trifluoromethanesulfonyl)amide (LiTFSA), $LiN(SO_2CF_3)_2$, or $LiN(SO_2C_2F_5)_2$; an organic lithium salt represented by $LiPF_n(C_pF_{2p+1})_{6-n}$ (wherein n is an integer of 1 to 5, p is an integer of 1 to 8) such as $LiPF_5(CF_3)$; an organic lithium salt represented by $LiBF_q(C_sF_{2s+1})_{4-q}$ (wherein q is an integer of 1 to 3, s is an integer of 1 to 8) such as $LiBF_3(CF_3)$; lithium bis (oxalate) borate (LiBOB) represented by $LiB(C_2O_4)_2$; halogenated LiBOB typified by lithium oxalatedifluoroborate (LiODFB) represented by $LiBF_2(C_2O_4)$; lithium bis (malonate)borate (LiBMB) represented by $LiB(C_3O_4H_2)_2$; lithium tetrafluorooxalatephosphate represented by $LiPF_4(C_2O_2)$.

The sodium salt includes $NaN(CF_3SO_2)_2$ (sodium bis-trifluoromethanesulfonimide), or $NaClO_4$. Further, there may be mentioned $NaPF_6$, NaTFSA, $NaClO_4$, $NaAsF_6$, $NaSbF_6$, $NaBF_4$, $NaCF_3SO_3$, $NaN(SO_2CF_3)_2$, a lower aliphatic carboxylic acid sodium salt, $NaAlCl_4$, $NaNO_3$, NaOH, NaCl, $Na_2SO_4$ and $Na_2S$, $NaAsF_6$, $NaTaF_6$, $Na_2B_{10}Cl_{10}$, $NaCF_3SO_3$, $Na(CF_3SO_2)_2N$, or $Na(C_2F_5SO_2)_2N$.

The magnesium salt includes magnesium inorganic salt compounds such as magnesium halide (such as magnesium chloride, magnesium bromide or magnesium iodide), magnesium perchlorate, magnesium tetrafluoroborate, magnesium hexafluorophosphate, or magnesium hexafluoroarsenate; or magnesium organic salt compounds such as bis (trifluoromethylsulfonyl) imide magnesium, magnesium benzoate, magnesium salicylate, magnesium phthalate, magnesium acetate, magnesium propionate, or Grignard reagent.

The Calcium salt includes calcium inorganic salt compounds such as calcium halide (such as calcium chloride, calcium bromide or calcium iodide), calcium perchlorate, calcium tetrafluoroborate, calcium hexafluorophosphate or calcium hexafluoroarsenate; or Calcium organic salt compounds such as bis (trifluoromethylsulfonyl) imide calcium, calcium benzoate, calcium salicylate, calcium phthalate, calcium acetate, or calcium propionate.

[3] Electric Storage Device

The electric storage device of the present invention comprises the electrolyte, a positive electrode containing a positive electrode active material, and a negative electrode containing a negative electrode active material. In particular, there may be mentioned a non-aqueous electrolyte secondary battery, an electric double layer capacitor, or a hybrid capacitor.

«Non-aqueous Electrolyte Secondary Battery»

The non-aqueous electrolyte secondary battery in which a non-aqueous electrolyte is used, is not limited, but includes a lithium ion secondary battery, a sodium ion secondary battery, a magnesium ion secondary battery, or a calcium ion secondary battery.

In connection with this, the electrolyte used in the present invention is quasi solid-state electrolyte which is quasi-solidified by comprising the inorganic nanofiber. Therefore, in the non-aqueous electrolyte secondary battery in which the quasi solid-state electrolyte is used, the liquid electrolyte is not used substantially. In the present specification, the non-aqueous electrolyte secondary battery of the present invention is simply referred to as an all solid secondary battery.

The positive electrode active material may be appropriately selected according to conducting ion species, i.e., the metal ions. The positive electrode is not limited, but may contain an electrical conductive material and/or a binder. The electrical conductive material is not particularly limited, so long as it can improve conductivity of the positive electrode, but for example, includes conductive carbon material. The conductive carbon material is not particularly limited, but a carbon material with a high specific surface area is preferable, in view of the area and space of the reaction field. In particular, there may be mentioned carbon black (such as an acetylene black, a ketjen black), an activated carbon, a carbon fiber (such as a carbon nanotube (CNT), a carbon nanofiber, a vapor grown carbon fiber). As the binder, there may be mentioned polyvinylidene fluoride (PVdF), polytetrafluoroethylene (PTFE), or the like. Further, the positive electrode generally has a current collector. As a material of the current collector, for example, there may be mentioned aluminum, SUS, nickel, iron, carbon, titanium, and the like.

The negative electrode active material is not particularly limited, so long as it can dope and dedope conducting ion species, i.e., metal ions.

The negative electrode may contain an electrical conductive material and/or a binder, if needed. The electrical conductive material is not particularly limited, so long as it can improve conductivity of the negative electrode, but for example, includes conductive carbon material. The conductive carbon material is not particularly limited, but a carbon material with a high specific surface area is preferable, in view of the area and space of the reaction field. In particular, there may be mentioned carbon black (such as an acetylene black, a ketjen black), an activated carbon, a carbon fiber (such as, a carbon nanotube (CNT), a carbon nanofiber, a vapor grown carbon fiber). As the binder, there may be mentioned polyvinylidene fluoride (PVdF), polytetrafluoroethylene (PTFE), or the like. The positive electrode generally has a current collector. As a material of the current collector, for example there may be mentioned SUS, nickel, copper, carbon, and the like.

(Lithium Ion Secondary Battery)

In the lithium ion secondary battery, lithium ions in the electrolyte perform an electric conduction. As the electrolyte of the lithium ion secondary battery of the present invention, there may be mentioned the electrolyte containing lithium salt described in item "[2] Electrolyte".

The positive electrode active material of the lithium ion secondary battery, for example, includes lithium transition metal compounds such as lithium nickel cobalt manganese oxide ($LiNi_xCo_{1-y-x}Mn_yO_2$, $LiCo_xMn_yO_2$, $LiCoMnO_4$, $LiNi_xCo_yO_2$, $LiNi_xMn_yO_2$, $Li_2NiMn_3O_8$, lithium cobaltate ($LiCoO_2$), lithium nickelate ($LiNiO_2$), lithium manganate ($LiMnO_2$), $LiMn_2O_4$, iron olivine ($LiFePO_4$), $Li_3Fe_2(PO_4)_3$, cobalt olivine ($LiCoPO_4$), nickel olivine ($LiNiPO_4$), manganese olivine ($LiMnPO_4$), lithium titanate ($Li_4Ti_5O_{12}$), lithium vanadium phosphate ($Li_3V_2(PO_4)_3$) [hereinafter, sometimes referred to as LVP]; and chalcogen compounds such as copper chevrel ($Cu_2Mo_6S_8$), iron sulfide (FeS), cobalt sulfide (CoS), or nickel sulfide (NiS).

The negative electrode active material, for example, includes carbon materials such as mesocarbon microbeads (MCMB), highly-oriented graphite (HOPG), hard carbon, or soft carbon; lithium transition metal oxides such as lithium titanate ($Li_4Ti_5O_{12}$); and metal alloys such as $La_3Ni_2Sn_7$.

(Sodium Ion Secondary Battery)

In the sodium ion secondary battery, sodium ions in the electrolyte perform an electric conduction. As the electrolyte of the sodium ion secondary battery of the present invention, there may be mentioned the electrolyte containing sodium salt described in item "[2] Electrolyte".

The positive electrode active material of the sodium ion secondary battery is preferably compounds having an O3 type layer structure or P2 type layer structure in which an intercalation complex with sodium ion is formed, or poly anion type compounds. For example, there may be mentioned sodium-containing transition metal oxide or sodium-containing transition metal phosphate. The sodium-containing transition metal oxide, for example, includes sodium chromate ($NaCrO_2$). A part of Na, or a whole or a part of Cr of sodium chromate may be substituted by other elements, and thus sodium chromate may be a compound represented by the general formula (2): $Na_{1-x}M1_xCr_{1-y}M2_yO_2$ ($0 \leq x \leq 2/3$, $0 \leq y \leq 1$, M1 and M2 is a metal element other than Cr and Na independently from each other). The sodium-containing transition metal oxide further includes $NaFeO_2$, $NaNi_{1/2}Mn_{1/2}O_2$, $NaFe0.4Ni0.3Mn0.3O_2$. The sodium-containing transition metal phosphate includes a compound represented by the general formula (3): $Na_aM3PO_4F_b$ ($1 \leq a \leq 2$, $0 \leq b \leq 2$, M3 is a metal element other than Na). For example, M3 is preferably one element selected from the group consisting of Fe, Co, Ni, and Mn. Specifically, there may be mentioned $NaFePO_4$, $Na_2FePO_4F$, $NaVPO_4F$, $NaCoPO_4$, $NaNiPO_4$, or $NaMnPO_4$.

(Magnesium Ion Secondary Battery)

In the magnesium ion secondary battery, magnesium ions in the electrolyte perform an electric conduction. As the electrolyte of the magnesium ion secondary battery of the present invention, there may be mentioned the electrolyte containing magnesium salt described in item "[2] Electrolyte".

The positive electrode active material of the magnesium ion secondary battery is not limited, so long as the material can reversibly dope and dedope magnesium. For example, there may be mentioned sulfide which can reversibly dope and dedope magnesium cation, oxide which can reversibly dope and dedope magnesium cation, organic compound which can reversibly dope and dedope magnesium cation, and the like. In particular, it includes molybdenum sulfide, manganese oxide, or the like.

The negative electrode active material preferably contains metallic magnesium or magnesium alloy. As the magnesium alloy, for example, there may be mentioned an alloy of magnesium and aluminum, an alloy of magnesium and zinc, an alloy of magnesium and manganese, or the like.

(Calcium Ion Secondary Battery)

In the calcium ion secondary battery, calcium ions in the electrolyte perform an electric conduction. As the electrolyte of the calcium ion secondary battery of the present invention, there may be mentioned the electrolyte containing calcium salt described in item "[2] Electrolyte".

The positive electrode active material of the calcium ion secondary battery is not limited, so long as the material can reversibly dope and dedope calcium. For example, there may be mentioned sulfide which can reversibly dope and dedope calcium cation, oxide which can reversibly dope and dedope calcium cation, organic compound which can reversibly dope and dedope calcium cation, and the like. In particular, it includes molybdenum sulfide, manganese oxide, or the like.

The negative electrode active material preferably contains metallic calcium or magnesium alloy. As the calcium alloy, for example, there may be mentioned an alloy of calcium and aluminum, an alloy of calcium and zinc, an alloy of calcium and manganese, or the like.

«Electric Double Layer Capacitor»

In the electric double layer capacitor of the present invention, materials used in the conventional electric double layer capacitor can be used without limitation, except that the "electrolyte" of the present invention is used. That is to say, the positive electrode active material, the negative electrode active material, and the like which were conventionally used, can be used without limitation.

As the positive electrode active material, there may be mentioned an activated carbon, a carbon whisker, a carbon nanotube, a graphene, a graphene nanoribbon, or a graphite. The positive electrode may comprise an electroconductive aid, a binder, and/or a current collector, in addition to the positive electrode active material.

Further, the electrode which has the same configuration as the positive electrode can be used as a negative electrode.

«Hybrid Capacitor»

The hybrid capacitor of the present invention is not limited, but includes a lithium ion capacitor, a sodium ion capacitor, a calcium ion capacitor, or a magnesium ion capacitor. In the hybrid capacitor of the present invention, materials used in the conventional hybrid capacitor can be used without limitation, except that the "electrolyte" of the present invention is used. That is to say, the positive electrode active material, the negative electrode active material, and the like which were conventionally used, can be used without limitation.

As a positive electrode active material of the hybrid capacitor of the present invention, materials which can reversibly support alkali metal ion such as lithium ion or alkali earths metal ion, and anion. In particular, there may be mentioned an activated carbon, a carbon whisker, or a graphite. Further, the positive electrode may comprise an electroconductive aid, a binder, and/or a current collector, in addition to the positive electrode active material.

As the negative electrode active material of the hybrid capacitor, the negative electrode active material described in the above item of the "non-aqueous electrolyte secondary battery" may be used. Further, the negative electrode may comprise an electroconductive aid, a binder, and/or a current collector, in addition to the negative electrode active material.

[4] Method for Increasing Viscosity of Liquid Molten Salt

The method for increasing a viscosity of liquid molten salt of the present invention is characterized in that an inorganic nanofiber having a functional group on a surface, is added to the liquid molten salt.

Three-dimensional networks of the inorganic nanofiber are formed by adding the inorganic nanofiber having the functional group to the liquid molten salt, to increase the viscosity of the molten salt. In connection to this, the term "increasing the viscosity" not only means that the viscosity of the molten salt is increased, but also means that the liquid molten salt is quasi-solidified or is turned into gel.

Further, the term "molten salt" generally means "a liquid state substance obtained by heat-fusing a solid salt" and thus the term "molten salt" used herein is synonymous with the term "liquid molten salt." However, the quasi solid-state molten salt or gelled molten salt can be obtained according to the method for increasing viscosity of liquid molten salt of the present invention. Therefore, in order to distinguish the liquid state molten salt from the quasi solid-state or gelled molten salt, the liquid state molten salt is referred to as "liquid molten salt" in the method for increasing a viscosity of liquid molten salt of the present invention.

In the method for increasing a viscosity of liquid molten salt of the present invention, the "molten salt" and the "inorganic nanofiber having a functional group" described in the above item "[1] molten salt composition" can be used without limitation.

(Additive Amount of Inorganic Nanofiber)

An amount of the inorganic nanofiber having a functional group for adding it to the liquid molten salt is not particularly limited, as long as the viscosity of the liquid molten salt is increased. However, the lower limit is preferably 0.5% by weight, more preferably 1.0% by weight, most preferably 1.5% by weight. The upper limit of the amount is not particularly limited, but preferably 10.0% by weight or less, more preferably 9.0% by weight or less, most preferably 8.0% by weight or less. The method for adding the inorganic nanofiber is not particularly limited, and the usual method can be used without limitation.

When a temperature of the molten salt composition is 150° C. or less, a viscosity of the liquid molten salt can be increased by a relatively small amount of inorganic nanofiber. Thus, the upper limit of the amount of the inorganic nanofiber is, for example, 5.0% by weight, preferably 4.5% by weight, more preferably 4.0% by weight. However, if the temperature of the liquid molten salt is high, the viscosity of the molten salt is decreased. For example, when the liquid molten salt with a temperature of about 250° C. is used, the inorganic nanofiber of more than 5.0% by weight may be sometimes required.

(Temperature)

The temperature for adding the inorganic nanofiber is not particularly limited in the method for increasing a viscosity of the present invention. However, the molten salts used in the present invention have inherent melting points respectively. That is, each molten salt is in a state of liquid molten salt at a temperature over the melting point thereof. Therefore, the inorganic nanofiber is preferably added to each molten salt at a temperature over the melting point thereof. If a difference between the melting point of each molten salt and the temperature upon addition is fewer, frequently, the whole may not be mixed uniformly. Therefore, the difference between the melting point of molten salt and temperature upon addition is preferably 1° C. or more, more preferably 3° C. or more, most preferably 5° C. or more.

Accordingly, the temperature for adding the inorganic nanofiber is not limited, but for example −95 to 400° C. The lower limit of the melting point of molten salt is about −95°, and the inorganic nanofiber having a functional group can increase the viscosity of the molten salt even at 0° C. or less. Further, the inorganic nanofiber having a functional group can increase the viscosity of the molten salt even at 400° C.

EXAMPLES

The present invention will now be further illustrated by, but is by no means limited to, the following Examples.

Manufacturing Example 1

In this manufacturing example, silica containing fiber ($SiO_2$ nanofiber) was manufactured. Tetraethoxysilane (TEOS) oligomer (61% by weight), γ-aminopropyltriethoxysilane (31% by weight), and boric acid (8% by weight), were mixed to produce viscous sol. After being allowed to stand for 2 days, the resulting sol spinning solution is subjected to the spinning by the electrospinning method, to obtain the $SiO_2$ nanofiber having the amino group. The electrospinning was carried out under the condition of an applied voltage of 24 kV and a distance between electrode substrates of 18 cm. A filament diameter of the resulting fiber was 400 nm.

Comparative Manufacturing Example 1

In this comparative manufacturing Example, $SiO_2$ nanofiber without amino groups on a surface was manufactured. Hydrochloric acid (0.8% by weight) was added to the mixture of tetraethoxysilane (TEOS) oligomer (13% by weight), polyvinyl pyrrolidone (PVP) (4% by weight), and absolute ethanol (82.2% by weight), and the whole was stirred for 2 hours, to obtain a spinning solution. The spinning solution is subjected to the spinning by the electrospinning method, to obtain the $SiO_2$/PVP composite nanofiber. The electrospinning was carried out under the condition of an applied voltage of 7 kV and a distance between electrode substrates of 8 cm. The resulting nanofiber was calcined at 550° C. for 3 hours, and PVP was removed by the pyrolysis, to prepare the $SiO_2$ nanofiber without amino groups on a surface. A filament diameter of the resulting fiber was 400 nm.

Example 1

3% by weight of the $SiO_2$ nanofiber obtained in Manufacturing Example 1 was added to 1-ethyl-3-methylimidazolium bis (fluorosulfonyl) amide(EMIFSA) to prepare a EMIFSA composition 1 in which a viscosity thereof was increased. In particular, 3 mL of EMIFSA was charged into a 10 mL volume vial bottle, and $SiO_2$ nanofiber obtained in Manufacturing Example 1 was added stepwise into the vial in small portion (0.5% by weight). After the addition of the $SiO_2$ nanofiber, the whole was sufficiently stirred by a magnetic stirrer so as to combine uniformly. According to the increase of the additive amount of the $SiO_2$ nanofiber, the viscosity of the EMIFSA composition becomes higher. The above procedure was repeated until the EMIFSA composition was turned into gel (EMIFSA composition 1). In this regard, these procedures were carried out under an atmosphere of argon gas. Further, EMIFSA was turned into gel by an addition of 2% by weight or 3.5% by weight of the $SiO_2$ nanofiber.

«Microscope Observation of Gel Structure»

Figure 2:
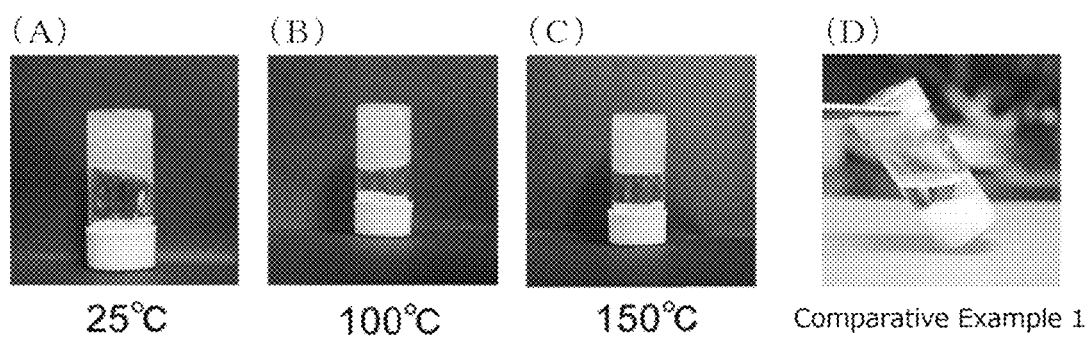
FIG. 2 is photographs showing that the molten salt compositions (EMIFSA and $SiO_2$NF) containing $SiO_2$ nanofiber with a functional group on a surface obtained in Example 1, were quasi-solidified at 25° C. (A), 100° C. (B), and 150° C. (C), and the molten salt composition containing $SiO_2$ nanofiber without a functional group on a surface was not quasi-solidified (D).
Figure 3:
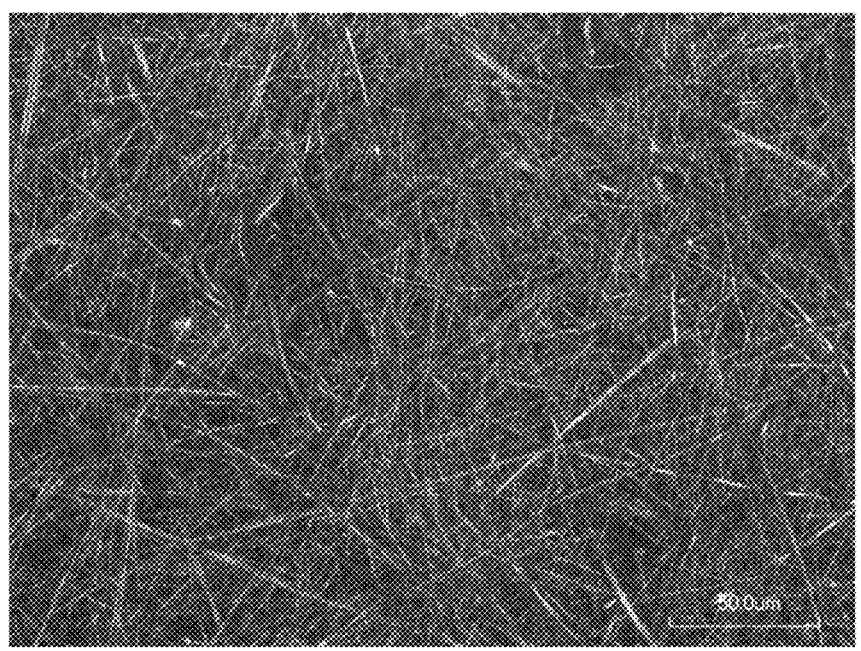
FIG. 3 is a three-dimensional laser microscope photograph showing the molten salt composition (EMIFSA and $SiO_2$NF) obtained in Example 1.

The vial bottle containing the obtained EMIFSA composition 1 was turned up side down and allowed to stand at 25° C., 100° C., and 150° C. for ten minutes (FIG. 2(A) to 2(C)). As shown in FIG. 2(C), it was maintained in a stable gel state even at 150° C. The photograph of the three-dimensional laser microscope (KEYENCE Corporation: VK-9700) at 25° C. is shown in FIG. 3. The nanofiber network structure was formed and it was recognized that EMIFSA was turned into gel by small additive amounts of inorganic nanofiber.

Comparative Example 1

The $SiO_2$ fiber obtained in Comparative Manufacturing Example 1 was added to 1-ethyl-3-methylimidazolium bis (fluorosulfonyl) amide (EMIFSA) by 0.5% by weight in the manner similar to that described in Example 1. In this step, the viscosity of the ionic liquid could not be increased, even when the additive amount of the nanofiber was increased to 3.5% by weight. After the mixing by the magnetic stirrer was terminated, the nanofiber was precipitated in EMIFSA, and thus a gel cannot be formed (FIG. 2(D)).

Comparative Example 2

In this Comparative Example, a gelation of 1-ethyl-3-methylimidazolium bis (fluorosulfonyl) amide (EMIFSA) was attempted using a commercially available filler (Kanto Chemical Co., Inc.; Nanotek (Registered trademark), an average particle diameter is 18.5 to 83.6 nm). In particular, 3 mL of EMIFSA was charged into a 10 mL volume vial bottle, and the filler was added stepwise into the vial in small portion (0.5% by weight). After the addition of the filler, the whole was sufficiently stirred by a magnetic stirrer so as to combine uniformly. The above procedure was repeated until the EMIFSA composition was turned into gel (EMIFSA composition 1). The EMIFSA was not turned into gel, even when the additive amount of the filler was increased to more than 20% by weight. However, the EMIFSA was turned into gel by adding the filler of 30% by weight.

Example 2

In this Example, a molten salt composition was manufactured using 1-butyl-1-methylpyrrolidinium bis (trifluoromethanesulfonyl) amide (Pyr14TFSA) as the ionic liquid.

The procedure described in Example 1 was repeated, except that Pyr14TFSA was used instead of EMIFSA, and the $SiO_2$ nanofiber (2.5% by weight) was used, to obtain Pyr14TFSA composition 2.

Example 3

In this Example, a molten salt composition was manufactured using 1-ethyl-3-methylimidazolium bis (trifluoromethanesulfonyl) amide (EMITFSA) as the ionic liquid.

The procedure described in Example 1 was repeated, except that EMITFSA was used instead of EMIFSA and 3% by weight or 3.5% by weight of the $SiO_2$ nanofiber was used, to obtain EMITFSA composition 3.

Example 4

The procedure described in Example 1 was repeated, except that the $SiO_2$ nanofiber (2% by weight) was added to EMIFSA, to obtain EMIFSA composition 4.

25% by weight of lithium bis (trifluoromethanesulfonyl) amide (LiTFSA) was added to EMITFSA and the whole was mixed by stirring to fully dissolve them. Subsequently, an appropriate quantity of the $SiO_2$ nanofiber was added thereto and the procedure described in Example 1 was repeated to obtain a molten salt composition (electrolyte) with the Li salt. A storage elastic modulus (G') and loss elastic modulus (G") of the molten salt composition at 40° C., 60° C., 80° C., 100° C., and 150° C. was measured by the following method.

Figure 4:
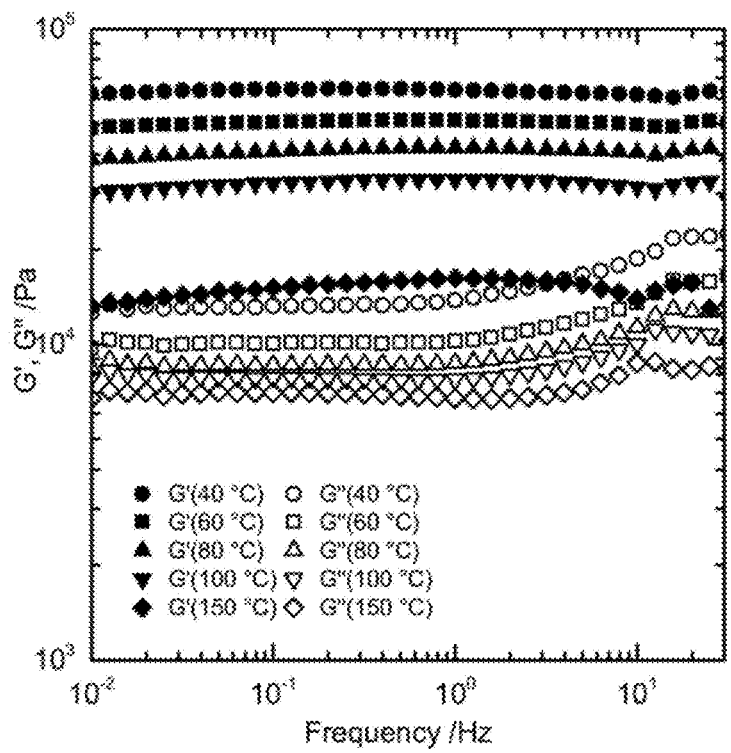
FIG. 4 is a graph showing rheological properties of molten salt composition obtained in Example 4 at 40° C. to 150° C.

Specifically, a sample was sandwiched between parallel plates of a rheometer (MCR-301; Anton Paar Japan K. K.) and the dynamic viscoelasticity was measured. The measurement was performed under the conditions of 1% of distortion, 0.01 to 30 Hz of measurement frequency, and 40 to 150° C. of measurement temperature. As shown in FIG. 4, the storage elastic modulus (G') is more than the loss elastic modulus (G") at all measurement temperatures of 40° C. to 150° C., and thus it was recognized that the resulting molten salt composition is in a gel state.

Example 5

In this Example, an ionic conductivity of the molten salt composition (electrolyte) was measured.

25% by weight of lithium bis (trifluoromethanesulfonyl) amide (LiTFSA) was added to each ionic liquid (EMIFSA, EMITFSA, Pyr14TFSA) and the whole was mixed by stirring to fully dissolve them. Subsequently, $SiO_2$ nanofibers of same amounts of Examples 1 to 4 were added thereto, to obtain respective molten salt compositions (electrolytes) with the Li salt. Ionic conductivities of these samples were measured.

Specifically, a spacer was sandwiched between two stainless electrodes with conducting wire, and the molten salt composition was charged into the spacer. Then, it was sealed by an imide tape, so that the sample would not leak, to prepare cells for measurement. An alternating-current impedance of these cells for measurement was measured at a range of 25° C. to 100° C. by means of SP-150 Potentiostat/Galvanostat (Bio-Logic SAS), and then ionic conductivity was calculated from the resulting resistance value and the cell constant (spacer thickness and sample area). In this regard, these procedures were carried out under an atmosphere of argon gas.

Figure 5:
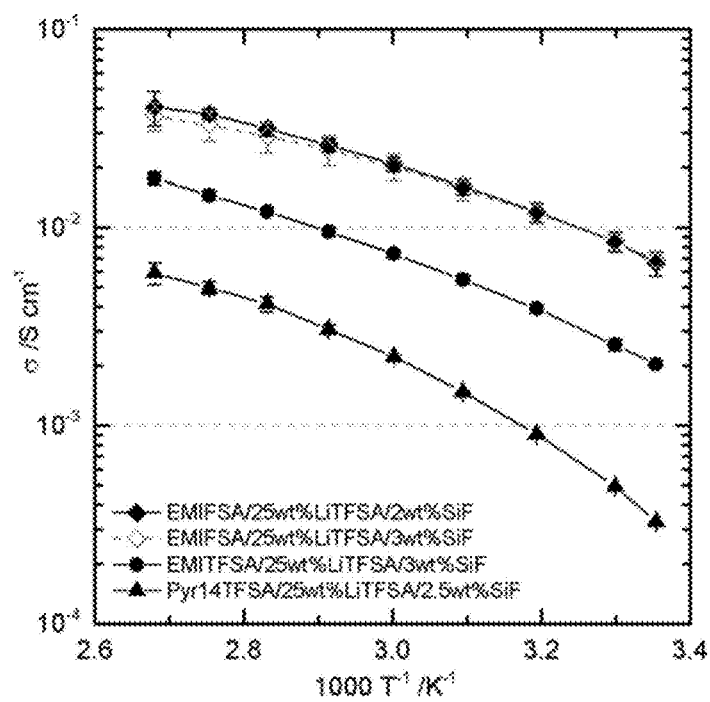
FIG. 5 is a graph showing ionic conductivities of molten salt compositions with Li salt obtained in Example 5.

As illustrated in FIG. 5, the molten salt compositions obtained in Example 5 exhibit excellent ionic conductivities.

Example 6

In this Example, an ionic conductivity of the molten salt composition (electrolyte) was measured when magnesium ion was used.

Figure 6:
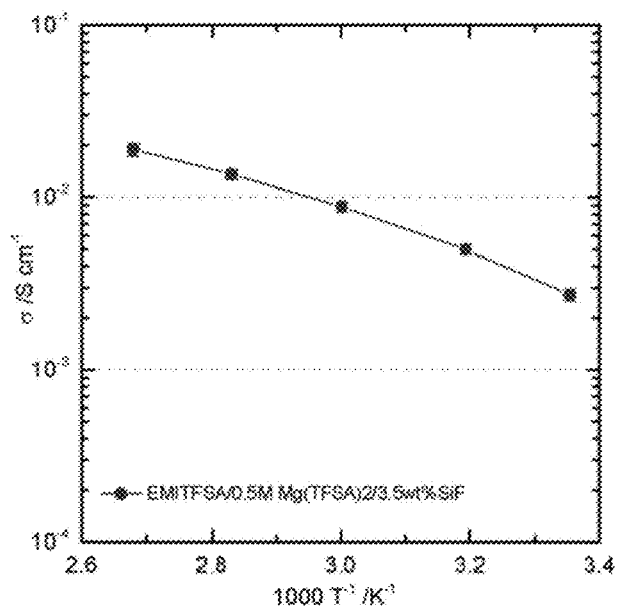
FIG. 6 is a graph showing ionic conductivities of molten salt composition with Mg salt obtained in Example 6.

The procedure described in Example 1 was repeated to obtain a molten salt composition, except that 0.5 mol/L of magnesium bis (trifluoromethanesulfonyl) amide (Mg(TFSA)$_2$) was added to EMITFSA, the whole was mixed by stirring to fully dissolve them, and then 3.5% by weight of the SiO$_2$ nanofiber was added thereto. As shown FIG. 6, the molten salt composition obtained in Example 6 exhibits an excellent ionic conductivity.

Example 7

In this Example, a molten salt, i.e., tetraethylammonium bis (trifluoromethanesulfonyl) amide (N$_{2,2,2,2}$TFSA) was mixed with Mg(TFSA)$_2$ at a molar ratio of 9:1, and the whole was dissolved by stirring at a heating temperature of 150° C. Subsequently, 3.5% by weight of SiO$_2$ nanofibers was added thereto, and the procedure described in Example 1 was repeated to obtain a molten salt composition 7-1 (electrolyte). In addition, the same procedure was repeated, except that the heating temperature is 200° C., and the amount of SiO$_2$ nanofibers is 4.5% by weight, to obtain a molten salt composition 7-2 (electrolyte). Even in the respective temperatures, the molten salts were turned into gel by the addition of SiO$_2$ nanofibers.

«Analysis of Functional Group»

Figure 7:
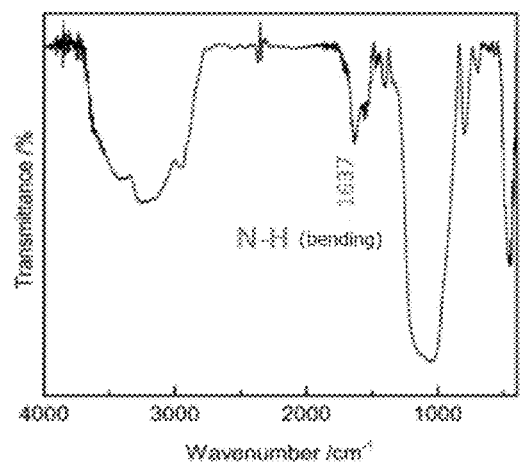
FIG. 7 is a chart showing an analysis result of an infrared absorption spectrum of $SiO_2$ nanofiber obtained in Manufacturing Example 1.
Figure 8:
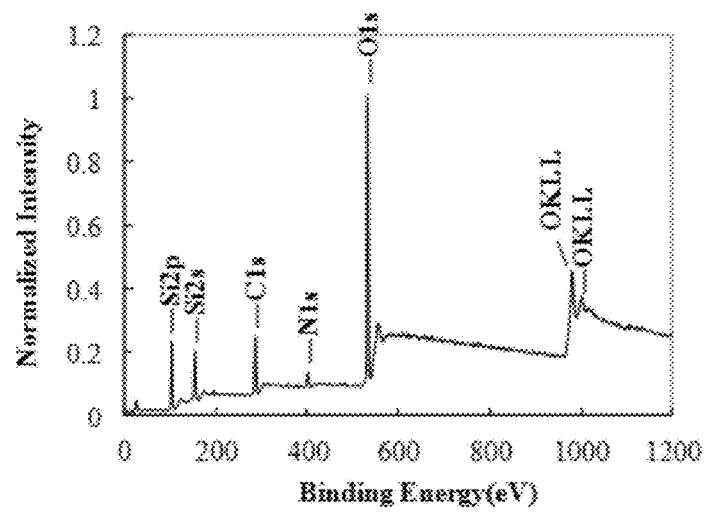
FIG. 8 is a chart showing an analysis result of an X-ray photoelectron spectroscopy of $SiO_2$ nanofiber obtained in Manufacturing Example 1.

The functional group of the SiO$_2$ nanofiber obtained in Manufacturing Example 1 was analyzed by using a Fourier transform infrared spectrometer (FT/IR-6300; JASCO Corporation) and X-ray photoelectron spectrometer (Quantum-2000; ULVAC-PHI, Inc.). The results of analyses were shown in FIG. 7 and FIG. 8, respectively. In the infrared absorption spectrum of FIG. 7, an absorption peak of N—H bending vibration derived from the amino group was observed at 1637 cm$^{-1}$. The result bears out the idea that the SiO$_2$ nanofiber obtained in Manufacturing Example 1 has amino groups. Further, in the spectrum of FIG. 8 obtained from X-ray photoelectron spectroscopy in about 5 mm of measurement depth, a peak of nitrogen atoms was observed. Therefore, the result supports the idea that the SiO$_2$ nanofiber obtained in Manufacturing Example 1 has amino groups.

«Analysis of Heat Resistance»

Figure 9:
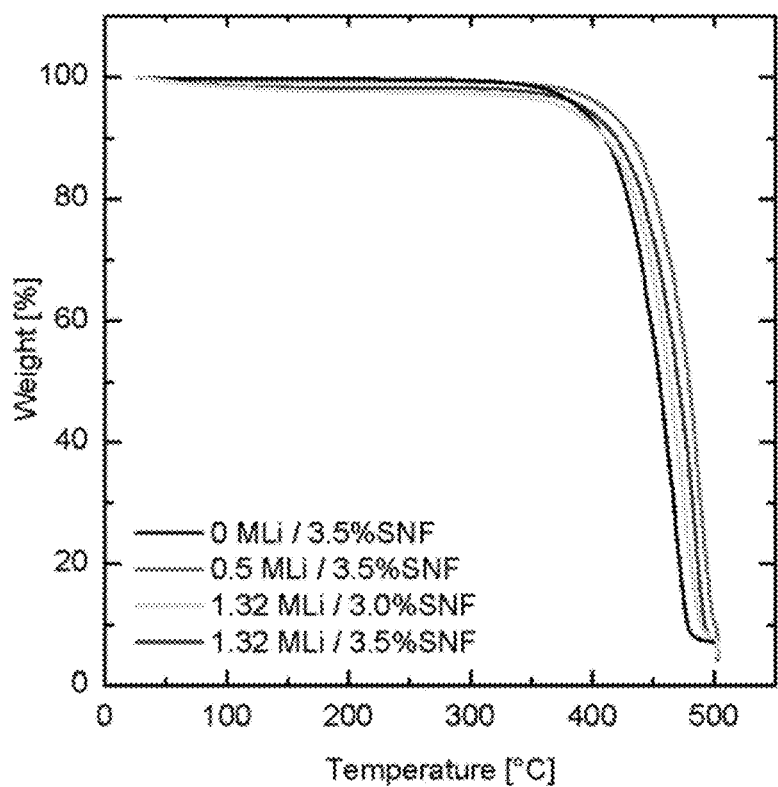
FIG. 9 is a graph showing a heat resistance measured by a thermogravimetric analyzer, of the electrolyte in which the lithium ion was added to the molten salt composition obtained in Example 3.

The heat resistance of EMITFSA composition 3 (Example 3) containing 0M, 0.5M, or 1.32M of lithium was measured by a thermogravimetry unit (TermoPlusEVOII; Rigaku Corporation). A weight of the resulting electrolyte decreases very little at a room temperature to 350° C., and thus the electrolyte exhibits an excellent heat resistance (FIG. 9).

Manufacturing Example 2

In this Manufacturing Example, the SiO$_2$ nanofiber was manufactured, followed by being subjected to a chemical treatment on a surface of the nanofiber to obtain a SiO$_2$ nanofiber having the amino group on its surface. The SiO$_2$ nanofiber manufactured in Comparative Example 1 was immersed in 3-aminopropylethoxysilane/toluene solution for 1 hour, filtered under reduced pressure, and heat-dried at 100° C. for 30 minutes. Then, it was washed for 5 minutes by ultrasonic in toluene. Then, it was filtered under reduced pressure again, washed in acetone, and vacuum-dried, to thereby obtain a surface-aminated SiO$_2$ nanofiber. A Fourier transform infrared spectroscopy of the resulting surface-aminated SiO$_2$ nanofiber was measured. An absorption peak of N—H bending vibration derived from the amino group was observed at about 1640 cm$^{-1}$, and thus it was recognized that the amino groups were introduced.

Manufacturing Example 3

In this Manufacturing Example, a titania nanofiber having the amino group was manufactured.

The procedure described in Comparative Manufacturing Example 1 was repeated except that tetraisopropyl orthotitanate (TTIP) was used as a sol-gel precursor instead of TEOS to manufacture the titania nanofiber. TTIP (26% by weight), PVP (2.2% by weight), absolute ethanol (41.8% by weight), and acetic acid (30% by weight) were mixed to prepare a solution, and the solution was used as a spinning solution. All procedures of solution preparation were carried out under an atmosphere of argon gas, because TIPP reacts readily. The prepared solution was subjected to the spinning by the electrospinning method, to obtain a titania/PVP composite fiber. The electrospinning was carried out under the condition of an applied voltage of 6 kV and a distance between electrode substrates of 8 cm. The resulting nanofiber was calcined at 500° C. for 1 hour, and the manufactured titania nanofiber was subjected to the chemical treatment described in Manufacturing Example 2 to obtain a surface-aminated titania nanofiber. A Fourier transform infrared spectroscopy measurement of the resulting surface-aminated titania nanofiber was carried out. An absorption peak of N—H bending vibration derived from the amino group was observed at about 1640 cm$^{-1}$, and thus it was recognized that the amino groups were introduced. According to the observation of an electron scanning microscope (JCM-5700; JEOL Ltd.), an average diameter of the resulting fiber was approximately 270 nm.

Manufacturing Example 4

In this Manufacturing Example, an alumina nanofiber having the amino group was manufactured.

The procedure described in Comparative Manufacturing Example 1 was repeated, except that aluminum isopropoxide (AIP) was used as a sol-gel precursor instead of TEOS to manufacture the alumina nanofiber. AIP (2.6% by weight), PVP (7.5% by weight), absolute ethanol (87.8% by weight), nitric acid (2.1% by weight) were mixed to prepare a solution, and the solution was used as a spinning solution. The electrospinning was carried out under the condition of an applied voltage of 18 kV and a distance between electrode substrates of 18 cm. The resulting nanofiber was calcined at 1100° C. for 2 hours, and the manufactured alumina nanofiber was subjected to the chemical treatment described in Manufacturing Example 2 to obtain a surface-aminated alumina nanofiber. A Fourier transform infrared spectroscopy of the resulting surface-aminated alumina nanofiber was measured. An absorption peak of N—H bending vibration derived from the amino group was observed at about 1640 cm$^{-1}$, and thus it was recognized that the amino groups were introduced. According to the observation of an electron scanning microscope (JCM-5700; JEOL Ltd.), an average diameter of the resulting fiber was approximately 300 nm.

Example 8

In this Example, 3% by weight of the surface-aminated SiO$_2$ nanofiber obtained in Manufacturing Example 2 was added to EMITFSA to prepare an EMITFSA composition 5 in which a viscosity thereof was increased. 3 mL of EMITFSA was charged into three vial bottles of 10 mL volume, respectively, and the surface-aminated SiO$_2$ nanofiber obtained in Manufacturing Example 2 was added stepwise into the vial in small portion (0.5% by weight). After the addition of the surface-aminated SiO$_2$ nanofiber to the vial bottles, the whole was sufficiently stirred by a magnetic stirrer so as to combine uniformly. According to the increase of an additive amount of the nanofiber, the viscosity of the EMITFSA composition becomes higher. The above procedure was repeated until the EMITFSA composition was turned into gel (EMIFSA composition 1), and a gelled EMITFSA composition 5 (ionic liquid gel using surface-aminated SiO$_2$ nanofiber) was obtained by adding 3% by weight of the surface-aminated SiO$_2$ nanofiber. In this regard, these procedures were carried out under an atmosphere of argon gas.

Example 9

In this example, 3% by weight of the surface-aminated titania nanofiber obtained in Manufacturing Example 3 was added to EMITFSA to prepare an EMITFSA composition 6 in which a viscosity thereof was increased. The procedure described in Example 8 was repeated except that surface-aminated titania nanofiber obtained in Manufacturing Example 3, was used instead of the surface-aminated titania nanofiber. A gelled EMITFSA composition 6 (ionic liquid gel using surface-aminated titania nanofiber) was obtained by adding 3% by weight of the surface-aminated SiO$_2$ nanofiber.

Example 10

In this Example, 3% by weight of the surface-aminated alumina nanofiber obtained in Manufacturing Example 4 was added to EMITFSA to prepare an EMITFSA composition 7 in which a viscosity thereof was increased. The procedure described in Example 8 was repeated except that the surface-aminated alumina nanofiber obtained in Manufacturing Example 4, was used instead of the surface-aminated SiO$_2$ nanofiber. A gelled EMITFSA composition 7 (ionic liquid gel using surface-aminated alumina nanofiber) was obtained by adding 3% by weight of the surface-aminated SiO$_2$ nanofiber. filament diameter of the obtained fiber was adjusted to 1000 nm, to obtain a SiO$_2$ nanofiber.

Manufacturing Example 5

The procedure described in Manufacturing Example 1 was repeated except that the filament diameter of the obtained fiber was adjusted to 1000 nm, to obtain a SiO$_2$ nanofiber.

Example 11

In this Example, an electrolyte containing lithium ion was prepared and a lithium ion secondary battery was manufactured using the same.

25% by weight of lithium bis (trifluoromethanesulfonyl) amide (LiTFSA) was added to 1-ethyl-3-methylimidazolium bis (trifluoromethanesulfonyl) amide (EMITFSA) and the whole was mixed by stirring to fully dissolve them. 3% by weight of the SiO$_2$ nanofiber obtained in Manufacturing Example 1 was added to the mixture to manufacture an EMITFSA composition. In particular, 3 mL of EMITFSA was charged into a 10 mL volume vial bottle, and the SiO$_2$ nanofiber was added stepwise into the vial in small portion (0.5% by weight). After the addition of the SiO$_2$ nanofiber, the whole was sufficiently stirred by a magnetic stirrer so as to combine uniformly. According to the increase of the additive amount of the SiO$_2$ nanofiber, the viscosity of the EMITFSA becomes higher. The above procedure was repeated until the EMITFSA was turned into gel, to thereby obtain a quasi solid-state electrolyte. In this regard, these procedures were carried out under an atmosphere of argon gas.

Lithium iron phosphate (LiFePO$_4$) as the positive electrode active material, polyimide as the binding agent, and acetylene black as the additive were mixed at a weight ratio of 84:8:8, to manufacture a positive electrode. Using an R2032 coin cell, the quasi solid-state electrolyte was applied on the positive electrode, and then a Li metal foil was placed thereon as the negative electrode. A secondary battery was manufactured by packing them using a coin cell swage.

Example 12

The procedure described in Example 11 was repeated except that the SiO$_2$ nanofiber having a diameter of 1000 nm obtained in Manufacturing Example 5 was used instead of the SiO$_2$ nanofiber having a diameter of 400 nm obtained in Manufacturing Example 1, to manufacture a secondary battery.

Comparative Example 3

Using an R2032 coin cell, a separator (polymer) was placed on a positive electrode. The separator was immersed in a mixture wherein 25% by weight of lithium bis (trifluoromethanesulfonyl) amide (LiTFSA) was added to 1-ethyl-3-methylimidazolium bis (trifluoromethanesulfonyl) amide (EMITFSA) and the whole was mixed by stirring to fully dissolve them, to prepare an electrolyte. Then, a Li metal foil was placed on the electrolyte, and they were packed by using a coin cell swage, to manufacture a secondary battery.

Example 13

In this Example, an electrolyte containing magnesium ion was prepared and a magnesium ion secondary battery was manufactured using the same.

The procedure described in Example 1 was repeated to obtain a quasi solid-state electrolyte, except that 0.5 mol/L of magnesium bis (trifluoromethanesulfonyl) amide (Mg(TFSA)$_2$) was added to EMITFSA, the whole was mixed by stirring to fully dissolve them, and then 3.5% by weight of the SiO$_2$ nanofiber was added thereto.

Vanadium pentoxide (V$_2$O$_5$) as the positive electrode active material, polyimide as the binding agent, and carbon black (Ketjen black) and carbon nanotube (VGCF) as the additive were mixed at a weight ratio of 90:5:3:2, and the mixture was applied on a carbon-coated aluminum plate, to manufacture a positive electrode. Using a stainless-steel 2-electrode cell (Hohsen Corp.), the quasi solid-state electrolyte manufactured in Example 13 was applied on the positive electrode, and then a magnesium metal which was ground in a glove box was placed thereon as the negative electrode. A secondary battery was manufactured by packing them using a coin cell swage.

Comparative Example 4

Using a stainless-steel 2-electrode cell (Hohsen Corp.), an electrolyte wherein a glass separator was immersed in a mixture in which 0.5 mol/L of magnesium bis (trifluoromethanesulfonyl) amide($Mg(TFSA)_2$) was added to EMITFSA and the whole was mixed by stirring to fully dissolve them, was placed on a positive electrode. Then, a magnesium metal which was ground in a glove box was placed thereon as the negative electrode, and a secondary battery was manufactured by packing them using a coin cell swage.

Example 14

In this example, a magnesium ion secondary was manufactured using tetraethylammonium bis (trifluoromethanesulfonyl) amide ($N_{2,2,2,2}TFSA$) as the ionic liquid. The procedure described in Example 13 was repeated to obtain a quasi solid-state electrolyte, except that $N_{2,2,2,2}TFSA$ was used instead of EMITFSA, to manufacture a magnesium ion secondary battery. However, all steps of adding 0.5 mol/L of magnesium bis (trifluoromethanesulfonyl) amide (Mg$(TFSA)_2$ ) to $N_{2,2,2,2}TFSA$, stirring to fully dissolve them, and adding 3% by weight of $SiO_2$ nanofiber, were carried out under the heating condition of 150° C.

Comparative Example 5

Using a stainless-steel 2-electrode cell (Hohsen Corp.), an electrolyte wherein a glass separator was immersed in a mixture in which 0.5 mol/L of $Mg(TFSA)_2$ was added to $N_{2,2,2,2}TFSA$ and the whole was mixed by stirring to fully dissolve them under the condition of 150° C., was placed on a positive electrode. Then, a magnesium metal which was ground in a glove box was placed thereon as the negative electrode, and a secondary battery was manufactured by packing them using a coin cell swage.

Example 15

Activated carbon electrode sheets (NIPPON VALQUA INDUSTRIES, LTD) were used as a positive electrode and a negative electrode of 2-electrode cell (HS flat cell; Hohsen Corp.) and the quasi solid-state EMITFSA composition obtained by adding 3% by weight of the $SiO_2$ nanofiber obtained in Manufacturing Example 1 to EMITFSA, was used as an electrolyte, to thereby manufacture an electric double layer capacitor. Then, a cyclic voltammetry was measured by means of Potentiostat/Galvanostat (SP-150; Bio-Logic SAS). Before use, the activated carbon electrodes were dried under reduced pressure at 150° C. for 3 hours, and were immersed into EMITFSA for 12 hours, and then they were used. A Silicon rubber with 1 mm of thickness was used as a guide of the quasi solid-state electrolyte.

Figure 17:
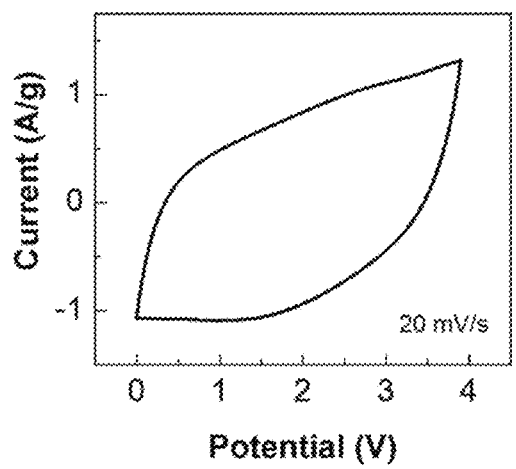
FIG. 17 is a graph showing the cyclic voltammograms of the capacitor using the quasi solid-state EMITFSA composition as an electrolyte.

A stable operation of the capacitor was confirmed at a potential window of 3.9V, and 139 F/g of electrostatic capacity per gross electrode weight was obtained at a scan speed of 20 mV/second (FIG. 17). The manufacturing of the capacitor and the measurement were carried out under an atmosphere of argon gas.

«Charge-discharge Test of Lithium Ion Secondary Battery»

Figure 10:
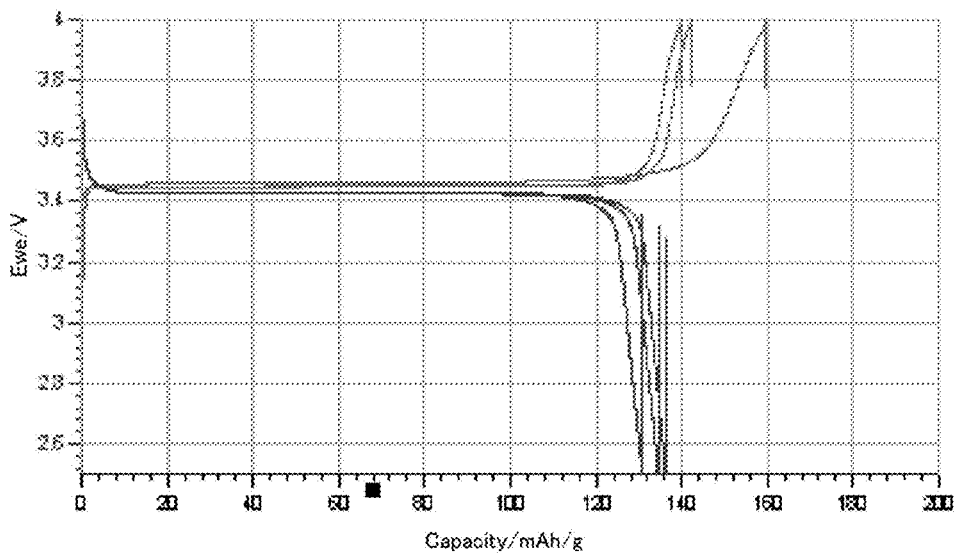
FIG. 10 is a graph showing the charge-discharge curves of the lithium ion secondary battery (Example 11) of the present invention at 65° C.
Figure 11:
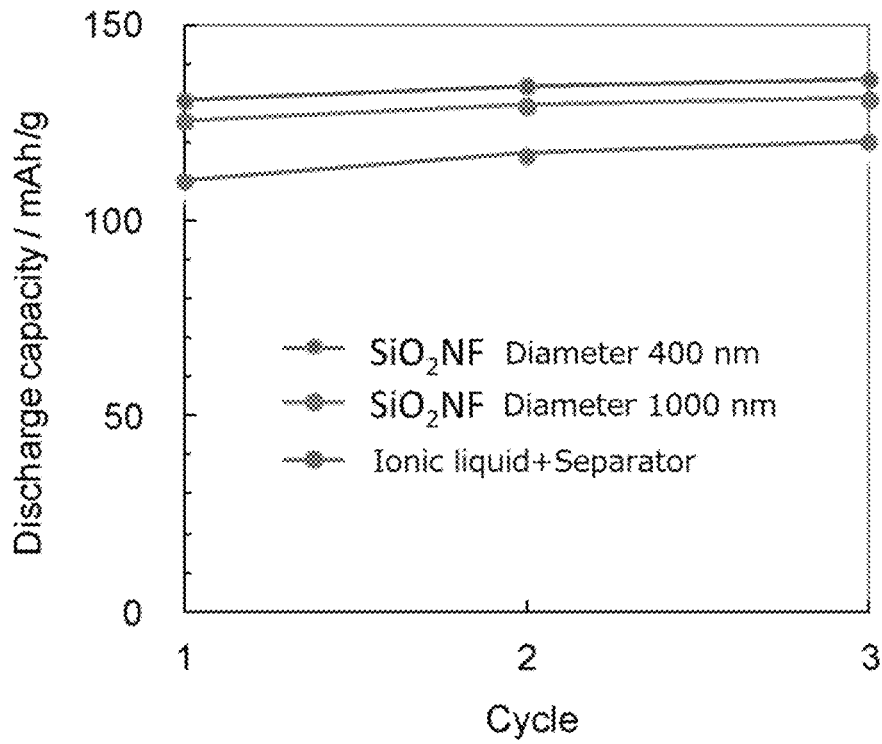
FIG. 11 is a graph showing the discharge capacities (3 cycles) of the lithium ion secondary batteries (Examples 11 and 12) of the present invention.

Using a computer-controlled potentiostat (VMP3; Bio-Logic SAS), constant current charging/discharging (corresponding to 0.1 C) was carried out for 3 cycles under the condition of 4V of Charge cutoff and 2.5V of discharge cutoff. FIG. 10 shows results under the condition of 65° C., 0.1 C, and 3 cycles, and it was recognized that all electrolytes act stably up to this given temperature. Further, when the operation temperature was raised (FIG. 11), it was shown that the electrolyte of the present invention can only act stably at a high temperature.

«Rate Performance»

Using the same device as in the charge-discharge test, charge and discharge were measured while varying current values for charge-discharge. The current values were set to 0.1 C, 1.0 C, 2.0 C, 5.0 C, and 10 C at 25° C.; 0.1 C, 1.0 C, 2.0 C, 5.0 C, 10 C, and 20 C at 65° C.; 1.0 C, 2.0 C, 5.0 C, 10 C, 15 C at 85° C. and 105° C., respectively, and the charge-discharge test was carried out.

Figure 12:
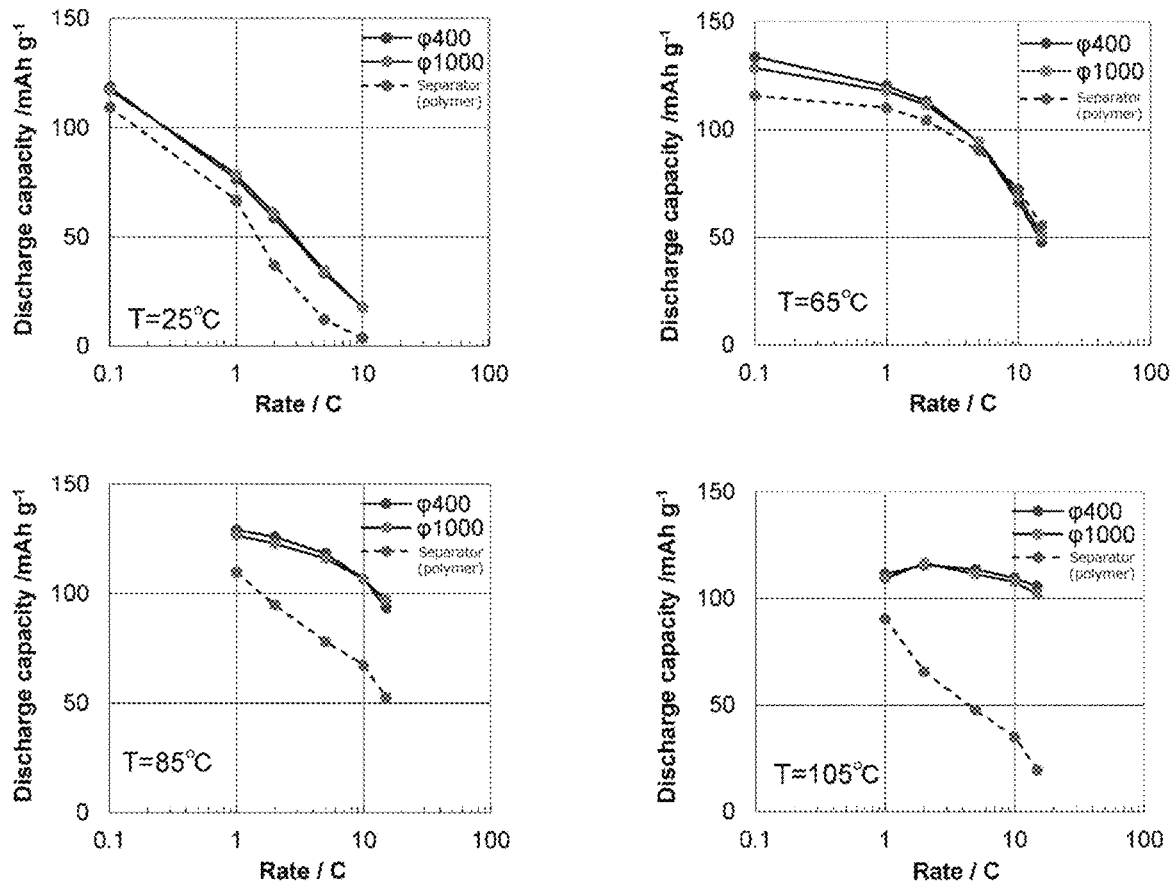
FIG. 12 is graphs showing rate performances of the lithium ion secondary batteries (Examples 11 and 12) of the present invention and the conventional lithium ion secondary battery (Comparative Example 3) using the ionic liquid and the separator, at 25° C., 65° C., 85° C., and 105° C.

As shown in FIG. 12, the lithium ion secondary batteries obtained in Examples 11 and 12 exhibit rate performances equal to or greater than the lithium ion secondary batteries using the ionic liquid and the separator, obtained in Comparative Example 3. In particular, they exhibited exceptional rate performances at high temperatures of 85° C. and 105° C.

«Measurement of Ion Transport Resistance (Rs) and Charge Transfer Resistance at Li Metal Interface (Rct)»

Regarding an internal resistance in the charge of the half-cell using the lithium iron phosphate ($LiFePO_4$) positive electrode obtained in Example 11, an alternating-current impedance (5 mV of AC amplitude, 500 kHz to 50 mHz of frequency range) was measured in an open-circuit voltage which does not load on the battery, using VMP3 (Bio-Logic SAS). Then, an intersection point with a real axis at an end of a high-frequency wave was interpreted as an ion transport resistance (Rs) of the electrolyte in the electrolyte part, and a width of an arc from the point to 0.1 Hz was interpreted as a charge transfer resistance at the Li metal interface (Rct).

Figure 13:
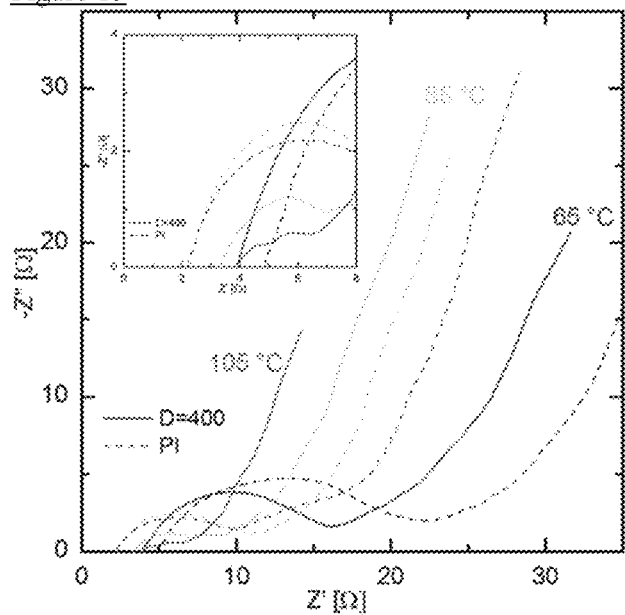
FIG. 13 is a figure showing ion transport resistance (Rs) and charge transfer resistances at lithium metal interface (Rct) of the lithium ion secondary battery (Example 11) of the present invention and a lithium ion secondary battery (Comparative Example 3) using the ionic liquid and the separator.

As shown in FIG. 13, the lithium ion secondary battery (Example 11) exhibits a low charge transfer resistance at the Li metal interface (Rct) compared to the lithium ion secondary battery obtained in Comparative Example 3, and thus it is considered that a contact between the electrode and the electrolyte is excellent.

«Charge-discharge Test of Magnesium Secondary Battery»

Using a computer-controlled potentiostat (VMP3; Bio-Logic SAS), constant current charging/discharging (corresponding to 0.05 C) was carried out for 3 cycles under the condition of capacity regulation (150 mAh/g).

Figure 14:
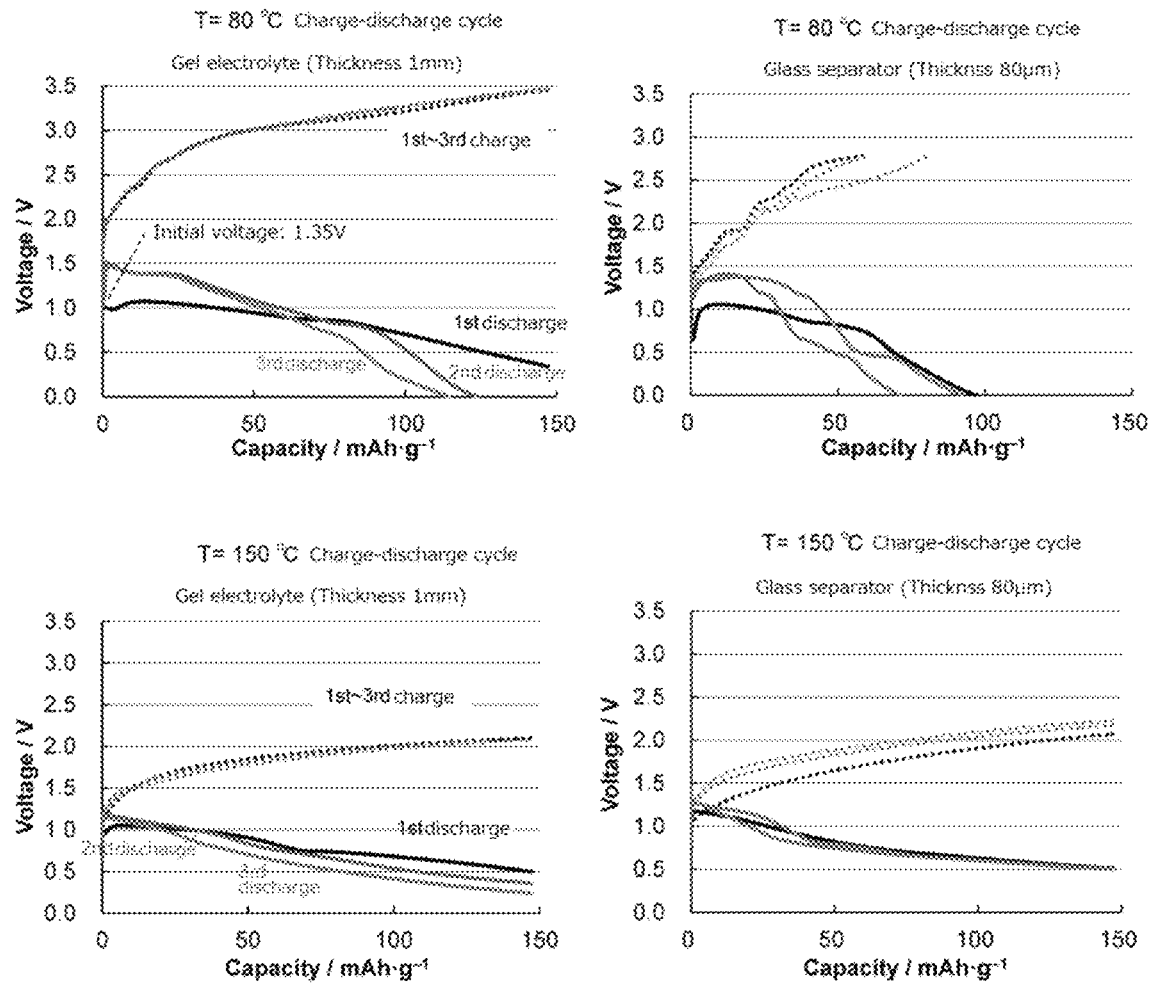
FIG. 14 is graphs showing the charge-discharge capacities of the magnesium ion secondary battery (Example 13) of the present invention, using EMI[TFSA]-$SiO_2$ gel as an electrolyte and the lithium ion secondary battery (Comparative example 4) using the ionic liquid (EMITFSA) and the separator, at 80° C., and 150° C.

As shown in FIG. 14, in the magnesium ion secondary battery (Example 13) of the present invention, a charge-discharge capacity at 80° C. was greatly increased as compared to the magnesium ion secondary battery using EMITFSA and the glass separator obtained in Comparative Example 4. Further, even at 150° C., it shows the same level of high charge-discharge capacity as the liquid electrolyte, and a stable charge-discharge curve was obtained. Thus, it is considered that smooth reaction was undergone on the Mg counter electrode.

Figure 15:
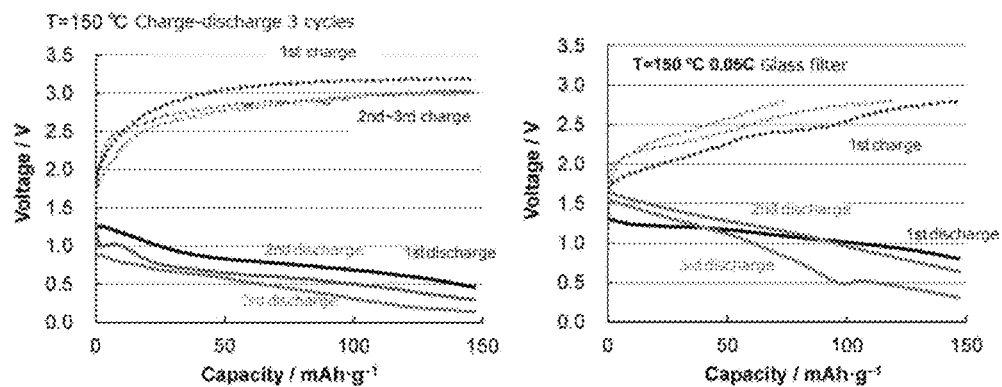
FIG. 15 is graphs showing the charge-discharge capacities of the magnesium ion secondary battery (Example 14) of the present invention, using $N_{2,2,2,2}$[TFSA]-$SiO_2$ gel as an electrolyte and the magnesium ion secondary battery (Comparative example 5) using the ionic liquid ($N_{2,2,2,2}$[TFSA]) and the separator, at 150° C.

Further, as shown in FIG. 15, the magnesium ion secondary battery using $N_{2,2,2,2}$[TFSA] as the ionic liquid (Example 14) also exhibits an excellent charge-discharge capacity.

«Measurement of Cyclic Voltammogram»

In an HS flat cell (Hohsen Corp.), magnesium as the positive electrode, and platinum as the negative electrode were used. Further, the quasi solid-state $N_{2,2,2,2}TFSA$ obtained by adding 3% by weight of the $SiO_2$ nanofiber (Manufacturing Example 1) containing MgTFSA (MgTFSA:$N_{2,2,2,2}$TFSA=1:9 (molar ratio)) was used as the electrolyte, to manufacture a 2-electrode cell. Then, a cyclic voltammetry was measured under the conditions of a temperature of 150° C. and a scan speed of 20 mV/second by means of the VMP3 (Bio-Logic SAS).

Figure 16:
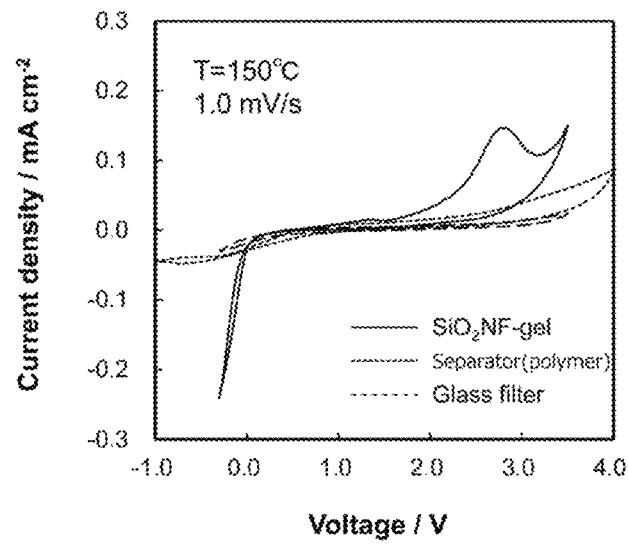
FIG. 16 is a graph showing the cyclic voltammograms of the electrolyte, i.e., $N_{2,2,2,2}$[TFSA]-$SiO_2$ gel.

As shown in FIG. 16, it was recognized that Mg was easily precipitated in the ionic liquid, by using $N_{2,2,2,2}$TFSA electrolyte containing Mg salt which was quasi-solidified by using the $SiO_2$ nanofiber of the present invention. Further, it was recognized that a precipitation positive electrode peak became clear and an overvoltage was reduced, as compared to the electrolyte obtained by immersing the porous material in the ionic liquid.

INDUSTRIAL APPLICABILITY

The method for increasing a viscosity of liquid molten salt of the present invention can be used in an electrolyte of a secondary battery exhibiting high ion conductivity, a slight-volatility, a flame resistance, and a thermal stability. Further, the method can be applied to various applications used at a wide temperature range. According to the present invention, electrochemical devices such as a secondary battery and a capacitor which are safe and exhibit an excellent battery performance, can be provided.

Although the present invention has been described with reference to specific embodiments, various changes and modifications obvious to those skilled in the art are possible without departing from the scope of the appended claims.

The invention claimed is:

1. A molten salt composition characterized by comprising an inorganic nanofiber having a functional group capable of molecularly-interacting with molten salt on a surface, and molten salt, wherein the inorganic nanofiber is selected from the group consisting of $SiO_2$ nanofiber, $TiO_2$ nanofiber, ZnO nanofiber, $Al_2O_3$ nanofiber, $ZrO_2$ nanofiber and combinations of two or more thereof.

2. The molten salt composition according to claim 1, wherein the molten salt comprises at least one cation selected from the group consisting of imidazolium cation, pyridinium cation, piperidinium cation, pyrrolidinium cation, phosphonium cation, morpholinium cation, sulfonium cation, and ammonium cation, and at least one anion selected from the group consisting of carboxylate anion, sulfonate anion, halogen anion, hydroxy anion, imide anion, boron anion, cyano anion, phosphorus anion, and nitrate anion.

3. The molten salt composition according to claim 1, wherein the molten salt is a deep eutectic solvent.

4. The molten salt composition according to claim 1, wherein the functional group is selected from the group consisting of an amino group, a hydroxyl group, a carboxyl group, a siloxane group, and combinations of two or more thereof.

5. The molten salt composition according to claim 1, wherein an amount of the inorganic nanofiber is 0.5 to 10.0% by weight.

6. An electrolyte characterized by comprising the molten salt composition according to claim 1, and a metal ion.

7. The electrolyte according to claim 6, wherein the metal ion is selected from the group consisting of lithium ion, calcium ion, sodium ion, and magnesium ion.

8. An electric storage device comprising an electrolyte according to claim 6, a positive electrode containing a positive electrode active material, and a negative electrode containing a negative electrode active material.

9. The electric storage device according to claim 8, which is a non-aqueous electrolyte secondary battery, an electric double layer capacitor, or a hybrid capacitor.

10. A method for increasing a viscosity of liquid molten salt, characterized in that an inorganic nanofiber having a functional group capable of molecularly-interacting with molten salt, on a surface, is added to the liquid molten salt, wherein the inorganic nanofiber is selected from the group consisting of $SiO_2$ nanofiber, $TiO_2$ nanofiber, ZnO nanofiber, $Al_2O_3$ nanofiber, $ZrO_2$ nanofiber and combinations of two or more thereof.

11. The method for increasing a viscosity of liquid molten salt according to claim 10, wherein the liquid molten salt comprises at least one cation selected from the group consisting of imidazolium cation, pyridinium cation, piperidinium cation, pyrrolidinium cation, phosphonium cation, morpholinium cation, sulfonium cation, and ammonium cation, and at least one anion selected from the group consisting of carboxylate anion, sulfonate anion, halogen anion, hydroxy anion, imide anion, boron anion, cyano anion, phosphorus anion, and nitrate anion.

12. The method for increasing a viscosity of liquid molten salt according to claim 10, wherein the functional group is selected from the group consisting of an amino group, a hydroxyl group, a carboxyl group, a siloxane group, and combinations of two or more thereof.

13. The method for increasing a viscosity of liquid molten salt according to claim 10, wherein an additive amount of the inorganic nanofiber is 0.5 to 10.0% by weight.

* * * * *